(12) United States Patent
Yamada et al.

(10) Patent No.: US 12,291,127 B2
(45) Date of Patent: May 6, 2025

(54) VEHICLE GEAR-SHIFTING CONTROL APPARATUS

(71) Applicant: Mazda Motor Corporation, Hiroshima (JP)

(72) Inventors: Makoto Yamada, Aki-gun (JP); Tooru Uematsu, Aki-gun (JP); Atsushi Yamasaki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 272 days.

(21) Appl. No.: 18/189,800

(22) Filed: Mar. 24, 2023

(65) Prior Publication Data

US 2023/0347749 A1 Nov. 2, 2023

(30) Foreign Application Priority Data

Apr. 5, 2022 (JP) .................. 2022-062884

(51) Int. Cl.
*B60L 7/26* (2006.01)
*B60L 15/20* (2006.01)

(52) U.S. Cl.
CPC ............. *B60L 7/26* (2013.01); *B60L 15/2009* (2013.01); *B60L 15/2036* (2013.01);
(Continued)

(58) Field of Classification Search
CPC .... B60L 7/26; B60L 15/2009; B60L 15/2036; B60L 2240/20; B60L 2240/24;
(Continued)

(56) References Cited

U.S. PATENT DOCUMENTS 8,170,767 B2 * 5/2012 Meyers ................. B60W 10/04
303/167
2003/0230933 A1 12/2003 Schneider et al.

FOREIGN PATENT DOCUMENTS

JP 2016132432 A 7/2016
JP 2020121624 A * 8/2020

OTHER PUBLICATIONS

English translation of Naito et al. (JP 2020121624) (Year: 2020).*
(Continued)

*Primary Examiner* — James M McPherson
*Assistant Examiner* — Kyle J Kingsland
(74) *Attorney, Agent, or Firm* — Alleman Hall & Tuttle LLP

(57) ABSTRACT

A vehicle gear-shifting control apparatus is equipped with an engine, a motor, an automatic transmission, a friction brake system, and a controller which executes regeneration control and gear-shifting control during deceleration of the vehicle with a braking force to front and rear wheels. The controller increases an input torque of an input shaft according to a downshift so that an accompanying acceleration fluctuation equals a target acceleration fluctuation. When the controller determines an oversteered state during the regeneration control and during a downshift, the controller increases the input torque so that a regenerative braking torque decreases while maintaining a regeneration operation of the motor and, at the same time, the controller causes the automatic transmission to perform the downshift in a state where an amount of increase of the input torque in accordance with the downshift has been increased compared to during a non-determination of the oversteered state.

9 Claims, 15 Drawing Sheets

(52) U.S. Cl.
CPC ....... *B60L 2240/20* (2013.01); *B60L 2240/24* (2013.01); *B60L 2240/48* (2013.01)

(58) Field of Classification Search
CPC .... B60L 2240/48; Y02T 10/62; B60W 10/18; B60W 30/02; B60W 30/18127; B60W 10/11; B60W 20/16; B60W 30/18145; B60K 2006/4825; B60K 6/547; B60K 6/387

See application file for complete search history.

(56) References Cited

OTHER PUBLICATIONS

European Patent Office, Extended European Search Report Issued in EP Application No. 23163636.6, Jul. 21, 2023, Munich, 8 pages.

* cited by examiner

|  | CL1 | CL2 | CL3 | BR1 | BR2 |
|---|---|---|---|---|---|
| 1ST SPEED | ○ |  |  | ○ | ○ |
| 2ND SPEED |  | ○ |  | ○ | ○ |
| 3RD SPEED | ○ | ○ |  |  | ○ |
| 4TH SPEED |  | ○ | ○ |  | ○ |
| 5TH SPEED | ○ |  | ○ |  | ○ |
| 6TH SPEED | ○ | ○ | ○ |  |  |
| 7TH SPEED | ○ |  | ○ | ○ |  |
| 8TH SPEED |  | ○ | ○ | ○ |  |
| REVERSE SPEED |  |  | ○ | ○ | ○ |

FIG. 2

VEHICLE GEAR-SHIFTING CONTROL APPARATUS

TECHNICAL FIELD

The technique disclosed herein relates to a vehicle gear-shifting control apparatus.

BACKGROUND ART

JP2016-132432A describes a control apparatus of a hybrid vehicle. The hybrid vehicle is equipped with an engine, a motor, and an automatic transmission. The engine and the motor are connected to an input shaft of the automatic transmission. The hybrid vehicle improves fuel efficiency performance by having the motor perform a regeneration operation when the automatic transmission performs a downshift.

SUMMARY OF INVENTION

Problem to be Solved by the Invention

With a rear-wheel drive vehicle in which an output shaft of an automatic transmission is connected to rear wheels, when a motor performs a regeneration operation, a regenerative braking torque is only imparted to the rear wheels. Therefore, for example, when the motor performs a regeneration operation during a turn while decelerating, a lateral force of the rear wheels decreases and a behavior of the vehicle is apt to fall into an oversteered state.

By stopping the regeneration operation of the motor when the vehicle falls into an oversteered state, since a braking force corresponding to a regenerative braking torque thereof is distributed to front wheels and the rear wheels by friction brakes, the lateral force of the rear wheels recovers and the oversteered state of the vehicle is resolved. However, stopping the regeneration operation causes a fuel efficiency performance of the hybrid vehicle to decrease.

Unfortunately, with conventional hybrid vehicles, a regeneration operation in a case where a rear-wheel drive vehicle falls into an oversteered state is not taken into consideration and it is impossible to achieve both suppression of oversteering and securement of a regeneration amount at the same time.

The technique disclosed herein achieves both suppression of oversteering and securement of a regeneration amount in a rear-wheel drive vehicle.

Means for Solving the Problem

According to an analysis by the present inventors of a relationship between behavioral stability and a regeneration amount of a rear-wheel drive vehicle, it was found that, after start of oversteering of the vehicle during deceleration, the oversteered state moves toward resolution without having to reduce the regeneration amount to zero as long as the regeneration amount decreases by a certain degree.

On the other hand, when the automatic transmission performs a downshift, a torque of the rear wheels fluctuates due to a moment of inertia of the automatic transmission which accompanies the downshift. There is a risk that a downshift when the rear-wheel drive vehicle is in an oversteered state may destabilize a behavior of the rear-wheel drive vehicle.

Due to the fluctuation of the torque of the rear wheels which accompanies a downshift of the automatic transmission as described above, acceleration of the vehicle fluctuates. During a downshift of the automatic transmission, control to increase an input torque which is input to the input shaft of the automatic transmission is performed so that the acceleration of the vehicle equals a target acceleration. Further studies carried out by the present inventors resulted in the following finding. When the oversteered state of the vehicle is determined during a downshift of the automatic transmission, the automatic transmission is caused to perform the downshift in a state where an amount of increase of the input torque of the input shaft has been increased as compared to an amount of increase during a non-determination of the oversteered state. It was found that, accordingly, a torque fluctuation of the rear wheels is suppressed and the automatic transmission can perform a downshift while suppressing destabilization of the behavior of the vehicle.

Specifically, the technique disclosed herein relates to a vehicle gear-shifting control apparatus. The gear-shifting control apparatus includes an engine which is mounted to a vehicle and which generates a travel drive force of the vehicle, a motor which generates another travel drive force of the vehicle and which supplies a battery with regenerative energy during deceleration of the vehicle, an automatic transmission of which an input shaft is connected to the engine and the motor and an output shaft is connected to rear wheels and which subjects an input rotation to gear-shifting at a transmission gear ratio corresponding to a shift stage and outputs the gear-shifted input rotation, a friction brake system which distributes a braking force to front wheels and the rear wheels in order to realize braking in accordance with a brake pedal operation by a driver; and a controller which executes, during deceleration of the vehicle during which the friction brake system is distributing the braking force to the front wheels and the rear wheels, a regeneration control of imparting a regenerative braking torque to the rear wheels by causing the motor to perform a regeneration operation and a gear-shifting control of causing the automatic transmission to perform a downshift by outputting a downshift signal in accordance with the rotation speed of the input shaft to the automatic transmission. The controller increases an input torque of the input shaft according to the downshift of the automatic transmission so that an acceleration fluctuation of the vehicle which accompanies the downshift equals a target acceleration fluctuation, and when the controller determines an oversteered state of the vehicle during the regeneration control and during the downshift, the controller increases the input torque of the input shaft of the automatic transmission so that the regenerative braking torque decreases while maintaining the regeneration operation of the motor and, at the same time, the controller causes the automatic transmission to perform the downshift in a state where an amount of increase of the input torque of the input shaft in accordance with the downshift has been increased as compared to an amount of increase during a non-determination of the oversteered state.

According to the configuration described above, the motor performs a regeneration operation during deceleration of the vehicle during which the friction brake system is distributing a braking force to the front wheels and the rear wheels. The control is regenerative coordination control by the friction brake system and the motor. Due to the regenerative coordination control, regenerative energy accumulated in the battery increases. A regenerative braking torque produced by the motor is only imparted to the rear wheels through the automatic transmission. The friction brake system distributes a braking force to the front wheels and the rear wheels in consideration of the regenerative braking torque which is imparted to the rear wheels. As a result, braking which acts on the vehicle is braking according to an operation on the brake pedal by the driver.

In addition, during deceleration of the vehicle, the controller outputs a downshift signal according to the rotation speed of the input shaft to the automatic transmission. The automatic transmission receives the downshift signal and executes a downshift of changing the shift stage from a high-speed stage to a low-speed stage. During deceleration of the vehicle, a shift stage corresponding to an operational state of the engine is selected.

When the oversteered state of the vehicle is determined during the regenerative coordination control described earlier and during the downshift, the controller increases an input torque of the input shaft so that the regenerative braking torque decreases. Accordingly, since the regenerative braking torque having been imparted to the rear wheels decreases and a lateral force of the rear wheels is secured, the oversteered state of the vehicle moves toward resolution. Note that the friction brake system compensates for a braking force corresponding to the amount of decrease of the regenerative braking torque.

While the regenerative braking torque decreases, the regeneration operation of the motor is maintained. Even when the vehicle is in the oversteered state, since as much of a regeneration amount as possible is secured, an advantage is gained in terms of improving fuel efficiency performance of the vehicle.

In this case, the controller increases the input torque of the input shaft according to the downshift of the automatic transmission so that an acceleration fluctuation of the vehicle which accompanies the downshift equals a target acceleration fluctuation. By increasing the input torque of the input shaft according to the downshift of the automatic transmission, the acceleration fluctuation of the vehicle equals the target acceleration fluctuation while suppressing excessive gear-shifting shock.

When the oversteered state of the vehicle is determined, the controller causes the automatic transmission to perform the downshift in a state where an amount of increase of the input torque of the input shaft during the downshift has been increased as compared to an amount of increase during the non-determination of the oversteered state. Accordingly, since a torque fluctuation of the rear wheels during a downshift is further suppressed, the behavior of the vehicle can be prevented from becoming unstable due to the downshift when an oversteered state is determined during the downshift.

Therefore, the gear-shifting control apparatus is capable of maintaining the regeneration operation and stabilizing the behavior of the vehicle.

During a determination of the oversteered state, the controller may increase the amount of increase of the input torque of the input shaft by setting the target acceleration fluctuation smaller than during the non-determination of the oversteered state.

In doing so, since the torque fluctuation of the rear wheels which accompanies a downshift is suppressed during a determination of the oversteered state, an advantage is gained in terms of stabilizing the behavior of the vehicle.

When the oversteered state of the vehicle diverges, the controller may cause the friction brake system to execute a control for stabilizing a behavior of the vehicle by imparting the braking force to the front wheels or the rear wheels.

In other words, when the oversteered state of the vehicle diverges, due to operation of DSC (Dynamic Stability Control) or ABS (Anti-lock Brake System), the behavior of the vehicle can be prevented from becoming uncontrollable.

The controller may execute a second regeneration control of imparting the regenerative braking torque to the rear wheels by causing the motor to perform the regeneration operation during deceleration of the vehicle during which the friction brake system is not imparting the braking force to the front wheels and the rear wheels, and the controller may maintain the regeneration operation when the oversteered state of the vehicle is determined during the second regeneration control.

For example, when the vehicle is decelerating in a state where the driver is neither depressing the accelerator pedal nor depressing the brake pedal, the controller imparts the regenerative braking torque to the rear wheels by having the motor perform the regeneration operation (in other words, second regeneration control). The regenerative braking torque in this case may be, for example, a braking torque corresponding to engine braking. This regenerative braking torque is relatively small.

When the oversteered state of the vehicle is determined during the second regeneration control, the motor maintains the regeneration operation. Accordingly, since a regeneration amount is secured, an advantage is gained in terms of improving fuel efficiency performance of the vehicle.

When the controller determines the oversteered state of the vehicle during the second regeneration control and during the downshift of the automatic transmission, the controller may maintain the regeneration operation of the motor and, at the same time, cause the automatic transmission to perform the downshift in a state where the amount of increase of the input torque of the input shaft in accordance with the downshift has been increased as compared to an amount of increase during the non-determination of the oversteered state.

Even when the oversteered state of the vehicle is determined during the second regeneration control, in a similar manner to that described above, the controller maintains the regeneration operation of the motor while suppressing destabilization of the behavior of the vehicle which accompanies a downshift by relatively increasing the input torque of the input shaft in accordance with the downshift.

During the downshift after the oversteered state of the vehicle has been resolved, the controller may cause the automatic transmission to perform the downshift in a state where the amount of increase of the input torque of the input shaft in accordance with the downshift has been increased as compared to the amount of increase during the non-determination of the oversteered state.

Even after the oversteered state has been resolved, there is a risk that the behavior of the vehicle may become unstable due to a downshift. Therefore, the automatic transmission performs a downshift in a state where the amount of increase of the input torque of the input shaft has been relatively increased. The behavior of the vehicle is prevented from becoming unstable accompanying the downshift.

The controller may determine the oversteered state of the vehicle by receiving signals of a first sensor which outputs a signal related to a behavior of the vehicle and a second sensor which outputs a signal related to a steering operation by the driver.

By determining the oversteered state based on signals of the first sensor and the second sensor, the controller can determine the behavior of the vehicle in a speedy and accurate manner.

Advantageous Effect of Invention

According to the vehicle gear-shifting control apparatus described above, both suppression of oversteering and securement of a regeneration amount in a rear-wheel drive vehicle can be achieved.

BRIEF DESCRIPTION OF DRAWINGS

FIG. 2 shows a fastening table of an automatic transmission.

MODE FOR CARRYING OUT THE INVENTION

Hereinafter, an embodiment of a vehicle gear-shifting control apparatus will be described with reference to the drawings. The gear-shifting control apparatus described herein is illustrative.

(Hybrid Automobile)

Figure 1:
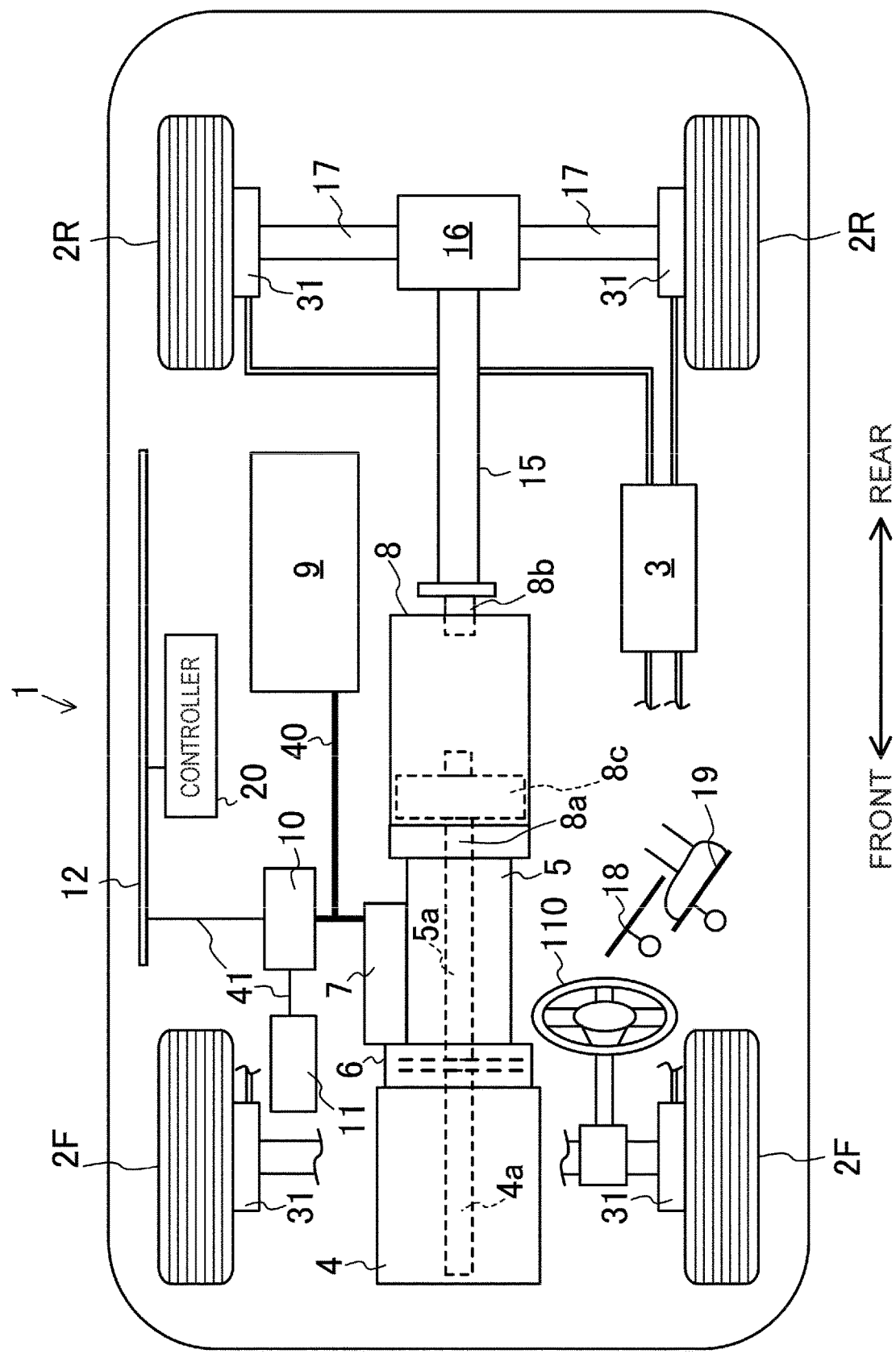
FIG. 1 shows a hybrid automobile.

FIG. 1 shows an automobile 1 (an example of the vehicle) to which the disclosed technique is applied. The automobile 1 is a hybrid automobile capable of traveling using electric power. The automobile 1 has a total of four wheels including front wheels 2F and rear wheels 2R. Friction brakes 31 are attached to the front wheels 2F and the rear wheels 2R in order to apply braking on rotations of the front wheels 2F and the rear wheels 2R.

An engine 4 and a motor 5 are mounted to the automobile 1 as drive sources. The engine 4 and the motor 5 cooperate with each other to drive the rear wheels 2R. Accordingly, the automobile 1 travels. The automobile 1 is a rear-wheel drive vehicle. The motor 5 is not only used as a drive source but is also used as a generator during regeneration.

The automobile 1 is equipped with a high-voltage battery 9 of which a rated voltage is 50 V or lower as will be described later. Due to supply of electric power from the high-voltage battery 9, traveling is carried out as the motor 5 mainly provides assistance to the engine 4 (a so-called mild hybrid vehicle). Alternatively, the automobile 1 may be a so-called plug-in hybrid vehicle to which electric power can be supplied from an outside power source.

In the case of the automobile 1, the engine 4 is disposed on a front side of a vehicle body and the drive wheels are arranged on a rear side of the vehicle body. In other words, the automobile 1 is a so-called front-engine, rear-wheel drive (FR) vehicle.

In addition to the engine 4 and the motor 5, the automobile 1 is equipped with a K0 clutch 6, an inverter 7, and an automatic transmission 8 as apparatuses of a drive system. The automobile 1 is also equipped with a controller 20 as an apparatus of a control system. The automobile 1 is also equipped with a friction brake system 3 including the friction brakes 31 as an apparatus of a brake system.

(Apparatuses of Drive System)

For example, the engine 4 is an internal combustion engine which burns fossil fuel. The engine 4 is also a so-called four-cycle engine which generates rotative power by repeating the respective cycles of intake, compression, expansion, and exhaust. While the engine 4 is available in various types or modes such as a spark-ignited engine and a compression-ignited engine, the type or the mode of the engine 4 is not particularly limited in the disclosed technique.

In the automobile 1, the engine 4 is disposed approximately in a center part in a vehicle width direction in a state where a crankshaft 4a which outputs rotative power is oriented in a front-rear direction of the vehicle body. Various apparatuses and mechanisms associated with the engine 4 such as an intake system, an exhaust system, and a fuel supply system are installed in the automobile 1.

The motor 5 is a permanent magnet-type synchronous motor which is driven by a three-phase AC current. The motor 5 is serially disposed to the rear of the engine 4 via the K0 clutch 6. The motor 5 is also serially disposed to the front of the automatic transmission 8.

The K0 clutch 6 is installed so as to be interposed between a front end part of a shaft 5a of the motor 5 and the crankshaft 4a of the engine 4. The K0 clutch 6 switches between a state (connected state) in which the crankshaft 4a and the shaft 5a are connected to each other and a state (disconnected state) in which the crankshaft 4a and the shaft 5a are disconnected from each other.

A rear end part of the shaft 5a of the motor 5 is connected to an input shaft 8a of the automatic transmission 8. Therefore, the engine 4 is connected to the automatic transmission 8 via the K0 clutch 6 and the shaft 5a. By putting the K0 clutch 6 in the disconnected state, the engine 4 is detached from the automatic transmission 8.

During traveling of the automobile 1, the K0 clutch 6 is switched between the connected state and the disconnected state. For example, during deceleration of the automobile 1, regeneration may be performed in a state where the K0 clutch 6 is switched to the disconnected state and the engine 4 is detached.

The motor 5 is connected via the inverter 7 and a high-voltage cable 40 to the high-voltage battery 9 which is mounted as a drive power source. In the case of the automobile 1, a DC battery with a rated voltage of 50 V or lower or, specifically, a 48 V DC battery is used as the high-voltage battery 9.

The high-voltage battery 9 supplies high-voltage DC electric power to the inverter 7. The inverter 7 converts the DC electric power into three-phase AC and feeds the converted power to the motor 5. Accordingly, the motor 5 is rotatively driven. In addition, the motor 5 supplies regenerative energy to the high-voltage battery 9.

The high-voltage battery 9 is also connected to a DC-DC converter 10 via the high-voltage cable 40. The DC-DC converter 10 converts high-voltage DC electric power of 48 V into low-voltage DC electric power of 12 V and outputs the converted low-voltage DC electric power. The DC-DC converter 10 (an output side thereof) is connected to a low-voltage battery 11 (a so-called lead-acid battery) via a low-voltage cable 41.

The low-voltage battery 11 is connected to various electrical components via the low-voltage cable 41. The DC-DC converter 10 is also connected to a CAN 12 (Controller Area Network) via the low-voltage cable 41. Accordingly, the DC-DC converter 10 supplies low-voltage DC electric power to the CAN 12.

The automatic transmission 8 is a multi-stage automatic transmission (a so-called AT). The automatic transmission 8 has the input shaft 8a in a front end portion thereof, and the input shaft 8a is connected to the shaft 5a of the motor 5 as described above. The automatic transmission 8 has, in a rear end portion thereof, an output shaft 8b which rotates independently of the input shaft 8a.

A transmission mechanism made up of a torque converter 8c, a plurality of planetary gear mechanisms, a plurality of friction fastening elements, and the like is built in between the input shaft 8a and the output shaft 8b. Each friction fastening element is switched between a fastened state and a non-fastened state by hydraulic pressure.

FIG. 2 shows a fastening table of the automatic transmission 8. A circle symbol in the table indicates fastening. Three clutches including a first clutch CL1, a second clutch CL2, and a third clutch CL3 and two brakes including a first brake BR1 and a second brake BR2 are incorporated into the automatic transmission 8 as friction fastening elements.

The automatic transmission 8 selects and fastens three elements from among the three clutches and the two brakes according to hydraulic control. Accordingly, the shift stage of the automatic transmission is switched to any one of forward shift stages from a first speed to an eighth speed and a reverse shift stage (reverse speed).

For example, at the first speed, the first clutch CL1, the first brake BR1, and the second brake BR2 are fastened. When shifting up from the first speed, by fastening the second clutch CL2 instead of the first clutch CL1, the shift stage is switched from the first speed to the second speed. By fastening the first clutch CL1 instead of the first brake BR1, the shift stage is switched from the second speed to the third speed. By fastening the third clutch CL3 instead of the first clutch CL1, the shift stage is switched from the third speed to the fourth speed.

Shifting up to the fifth and higher speeds is performed in a similar manner. Shifting down involves an opposite procedure to the switching performed when shifting up.

When elements to be fastened in each shift stage are not fastened, a state is created where the input shaft 8a and the output shaft 8b are detached from each other (so-called neutral). Even when rotative power is input to the automatic transmission 8 from the drive sources, the rotative power is not output from the automatic transmission 8.

As will be described later, the automatic transmission 8 may be shifted to neutral during deceleration of the automobile 1. Specifically, when the automatic transmission 8 is in the second speed, the third speed, or the fourth speed, the automatic transmission 8 is shifted to neutral by opening the second clutch CL2. In addition, when the automatic transmission 8 is in the fifth speed, the sixth speed, the seventh speed, or the eighth speed, the automatic transmission 8 is shifted to neutral by opening the third clutch CL3. In the following description, the second clutch CL2 and the third clutch CL3 may be collectively referred to as a K1 clutch. Opening the K1 clutch during deceleration of the automobile 1 means interrupting motive power transmission between the input shaft 8a and the output shaft 8b of the automatic transmission 8 and shifting the automatic transmission 8 to neutral.

As shown in FIG. 1, the output shaft 8b of the automatic transmission 8 is connected to a differential gear 16 via a propeller shaft 15 which extends in the front-rear direction of the vehicle body. A pair of drive shafts 17 which extend in a vehicle width direction and which is connected to the left and right rear wheels 2R, 2R are connected to the differential gear 16. Rotative power output through the propeller shaft 15 is distributed by the differential gear 16 and then transmitted to each rear wheel 2R though the pair of drive shafts 17, 17.

(Gear-Shifting Control Apparatus)

Figure 3:
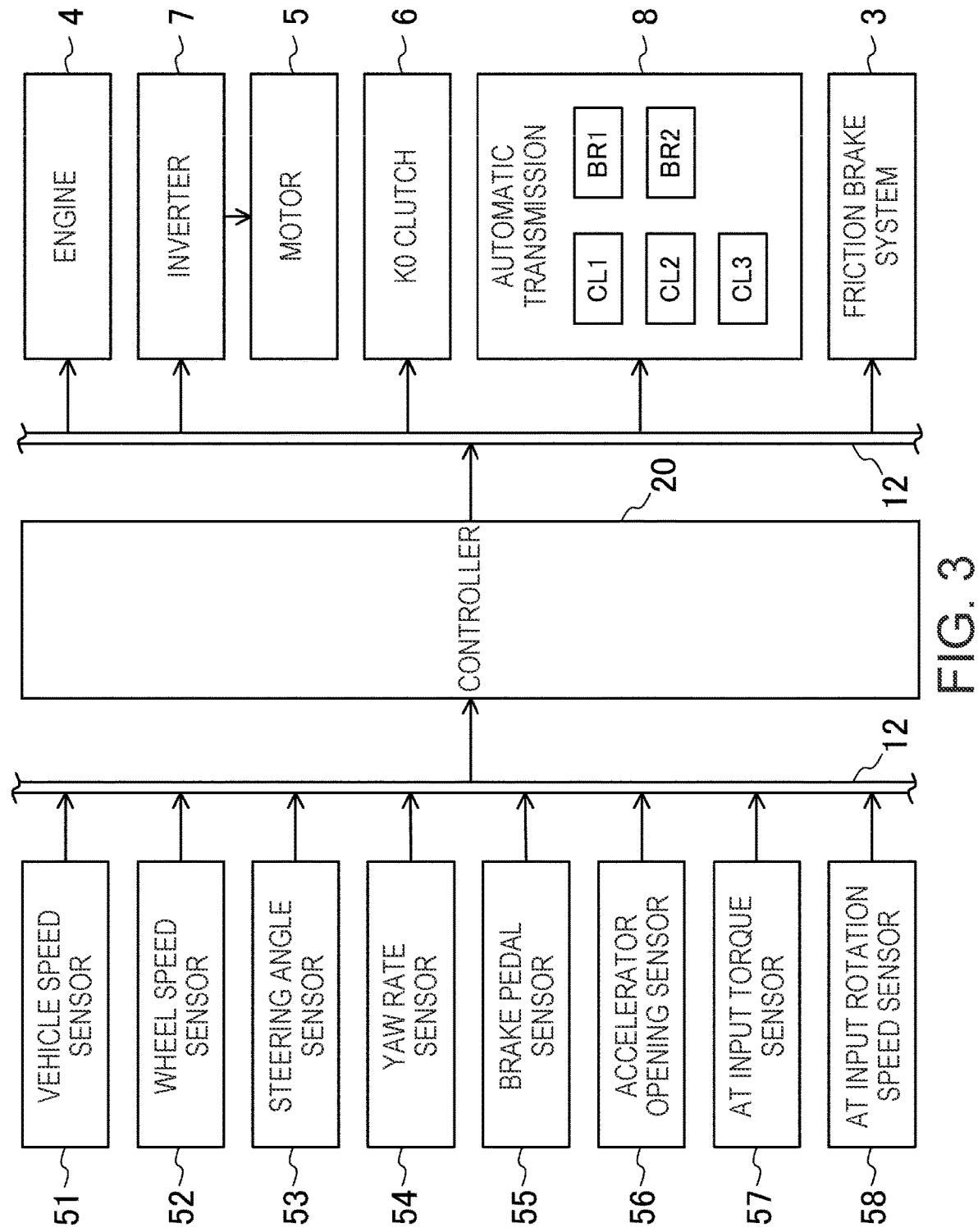
FIG. 3 is a block diagram of a gear-shifting control apparatus.

FIG. 3 is a block diagram of a gear-shifting control apparatus. The controller 20 described above is installed in the automobile 1 in order to control the engine 4, the motor 5, the K0 clutch 6, the automatic transmission 8, the friction brake system 3, and the like according to operations by the driver and to control traveling of the automobile 1. The controller 20 is made up of hardware including a processor, memory, and an interface and software including a database and a control program. Note that while one controller 20 is shown in the gear-shifting control apparatus shown in FIG. 3, the controller of the gear-shifting control apparatus may be divided into a unit (powertrain control module (PCM)) which mainly controls operations of the drive sources (the engine 4 and the motor 5) and a unit (transmission control module (TCM)) which mainly controls operations of the K0 clutch 6 and the automatic transmission 8. The PCM and the TCM are connected by the CAN 12 and are configured to be capable of performing telecommunications with each other.

The gear-shifting control apparatus is equipped with sensors which measure various parameters related to traveling of a vehicle. Specifically, the gear-shifting control apparatus is equipped with a vehicle speed sensor 51, a wheel speed sensor 52, a steering angle sensor 53, a yaw rate sensor 54, a brake pedal sensor 55, an accelerator opening sensor 56, an AT input torque sensor 57, and an AT input rotation speed sensor 58.

The vehicle speed sensor 51 outputs a signal corresponding to a vehicle speed of the automobile 1. The wheel speed sensor 52 outputs a signal corresponding to the rotation speed of each wheel among the four wheels 2F and 2R of the automobile 1.

The steering angle sensor 53 outputs a signal corresponding to a rotation angle of a steering wheel 110 (refer to FIG. 1) operated by the driver or, in other words, a steering angle. The yaw rate sensor 54 outputs a signal corresponding to a yaw rate of the automobile 1.

The brake pedal sensor 55 outputs a signal corresponding to depressing of a brake pedal 19 (refer to FIG. 1) operated by the driver. The accelerator opening sensor 56 outputs a signal corresponding to depressing of an accelerator pedal 18 (refer to FIG. 1) operated by the driver.

The AT input torque sensor 57 outputs a signal corresponding to an input torque of the input shaft 8a of the automatic transmission 8. The AT input rotation speed sensor 58 outputs a signal corresponding to the rotation speed of the input shaft 8a of the automatic transmission 8.

The controller 20 receives, via the CAN 12, signals output by the sensors. The controller 20 outputs control signals to the engine 4, the inverter 7, the K0 clutch 6, the automatic transmission 8, and the friction brake system 3 through the CAN 12. Accordingly, the controller 20 controls the engine 4, the motor 5, the K0 clutch 6, the automatic transmission 8, and the friction brake system 3.

(Control Related to Behavioral Stability)
<Entirety of Control>

Figure 4:
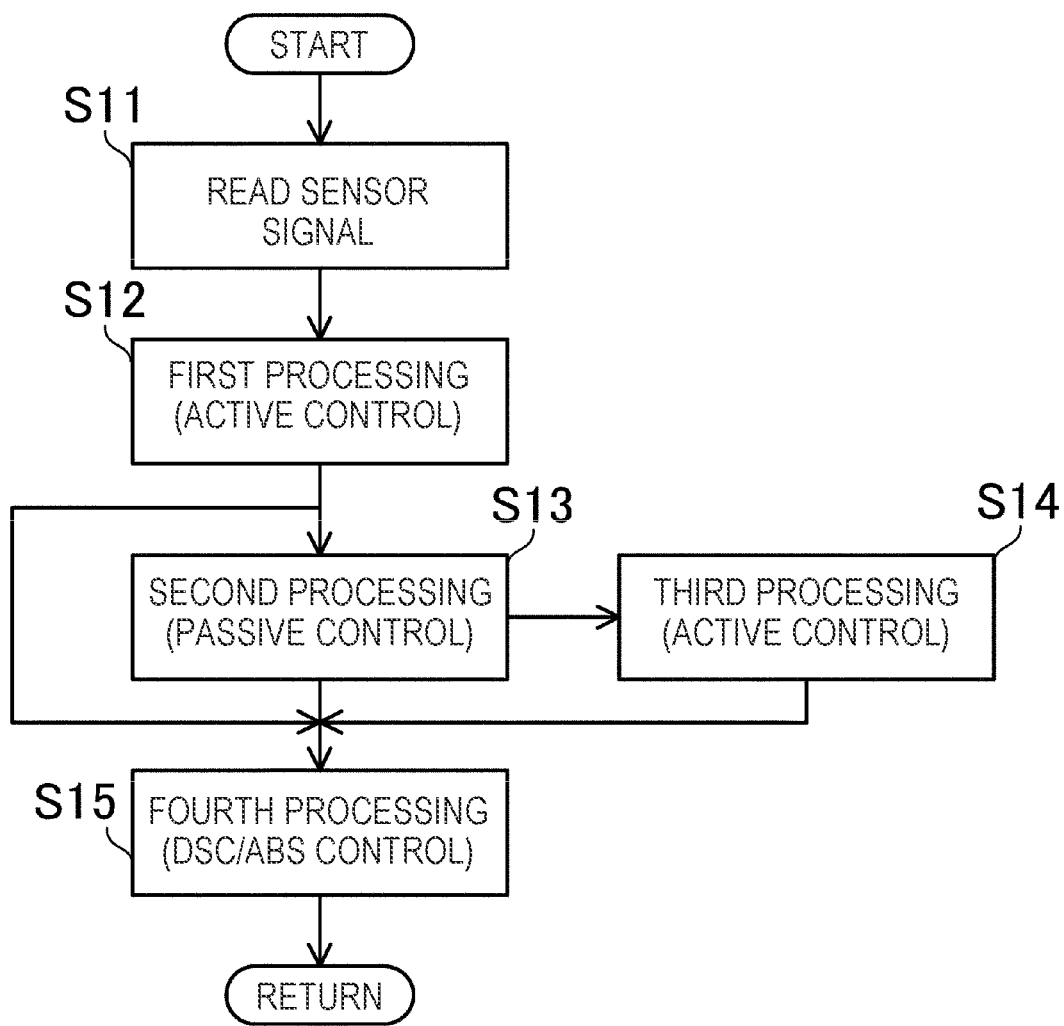
FIG. 4 is a flow chart of overall control related to behavioral stability.

FIG. 4 shows an entirety of control related to behavioral stability of the automobile 1. Note that the flows shown in FIG. 4 and FIGS. 6, 8 to 11, and 15 to be described later are basically related to control during deceleration of the automobile 1.

Figure 5:
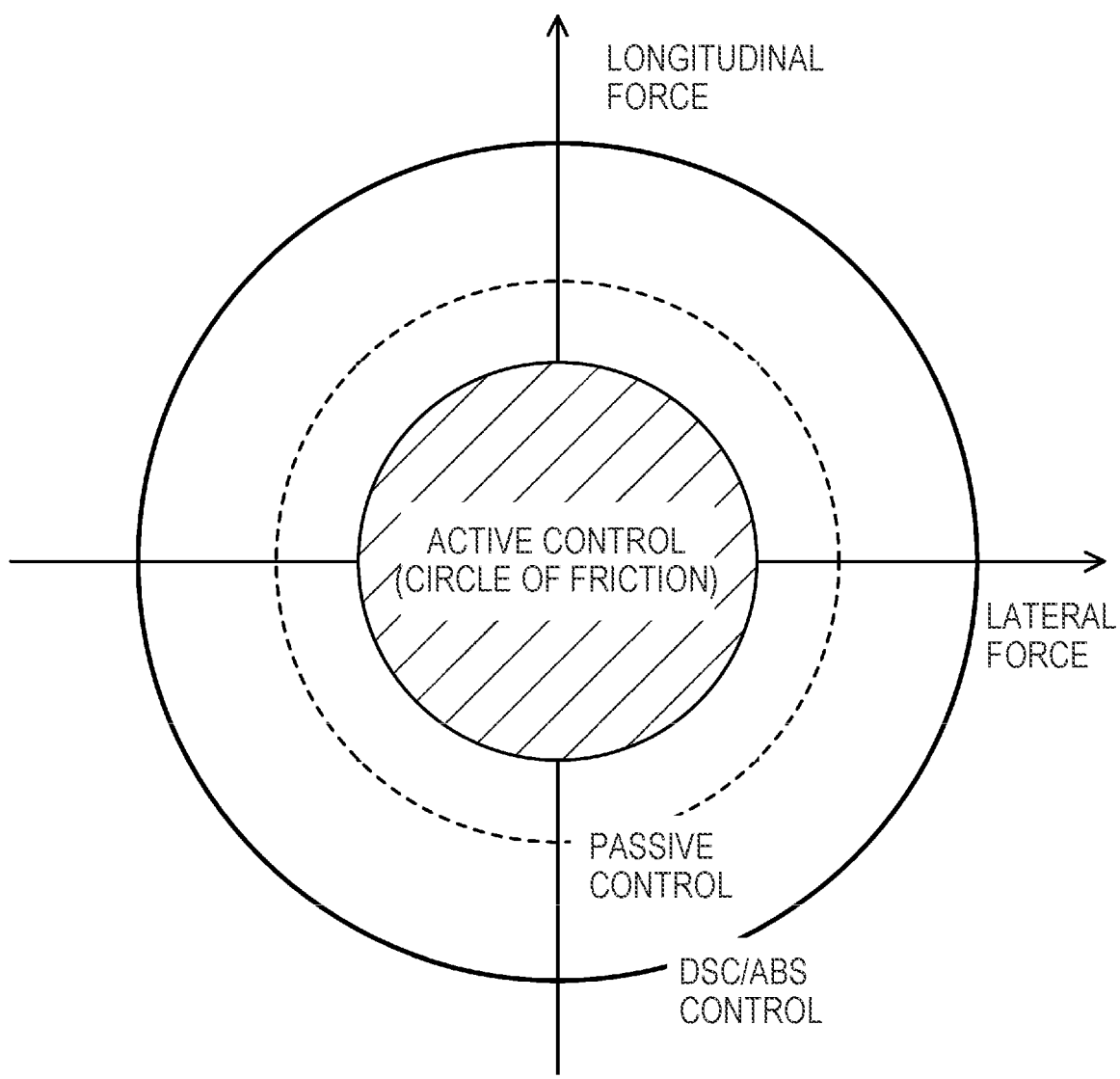
FIG. 5 is a diagram explaining a function of control related to behavioral stability.

FIG. 5 shows a concept of functions of control related to the behavioral stability of the automobile 1. The automobile 1 has three functions, namely, active control, passive control, and DSC/ABS (Dynamic Stability Control/Anti-lock Brake System) control. Active control functions so as to keep a grip force of the wheels 2F and 2R within a circle of friction illustrated in FIG. 5. The behavioral stability of the automobile 1 is maintained as long as the grip force of the wheels 2F and 2R stay within the circle of friction. Active control is control for maintaining the behavioral stability of the automobile 1.

Passive control functions to return the grip force of the wheels 2F and 2R into the circle of friction when the grip force of the wheels 2F and 2R exceeds the circle of friction and the behavior of the automobile 1 becomes unstable.

DSC/ABS control functions to return the grip force of the wheels 2F and 2R into the circle of friction when the behavior of the automobile 1 is about to diverge or, in other words, when the grip force of the wheels 2F and 2R is about to exceed a circle with a largest diameter by having the friction brake system 3 impart a braking force to each of the wheels 2F and 2R through the friction brakes 31. Known techniques can be adopted for the DSC/ABS control.

The automobile 1 having the three functions is capable of securing behavioral stability of the vehicle.

In the flow shown in FIG. 4, in step S11 after start of the process, the controller 20 reads a sensor signal. The controller 20 determines a traveling state of the automobile 1. Subsequently, the controller 20 executes first processing (step S12). The first processing is related to active control and switches gear-shifting control according to a road surface coefficient of friction (u). Details of the first processing will be provided later.

After the first processing in step S12, the process makes a transition to second processing (step S13) or fourth processing (step S15). The second processing is related to passive control and to gear-shifting control when the automobile 1 falls into an oversteered state. Details of the second processing will be provided later.

After step S13, the process makes a transition to third processing (step S14) or the fourth processing (step S15). The third processing is related to active control and switches gear-shifting control according to a slip state of the wheels 2F and 2R. Details of the third processing will be provided later. In addition, the fourth processing is DSC/ABS control. Details of the fourth processing will be provided later.

<First Processing>

Figure 6:
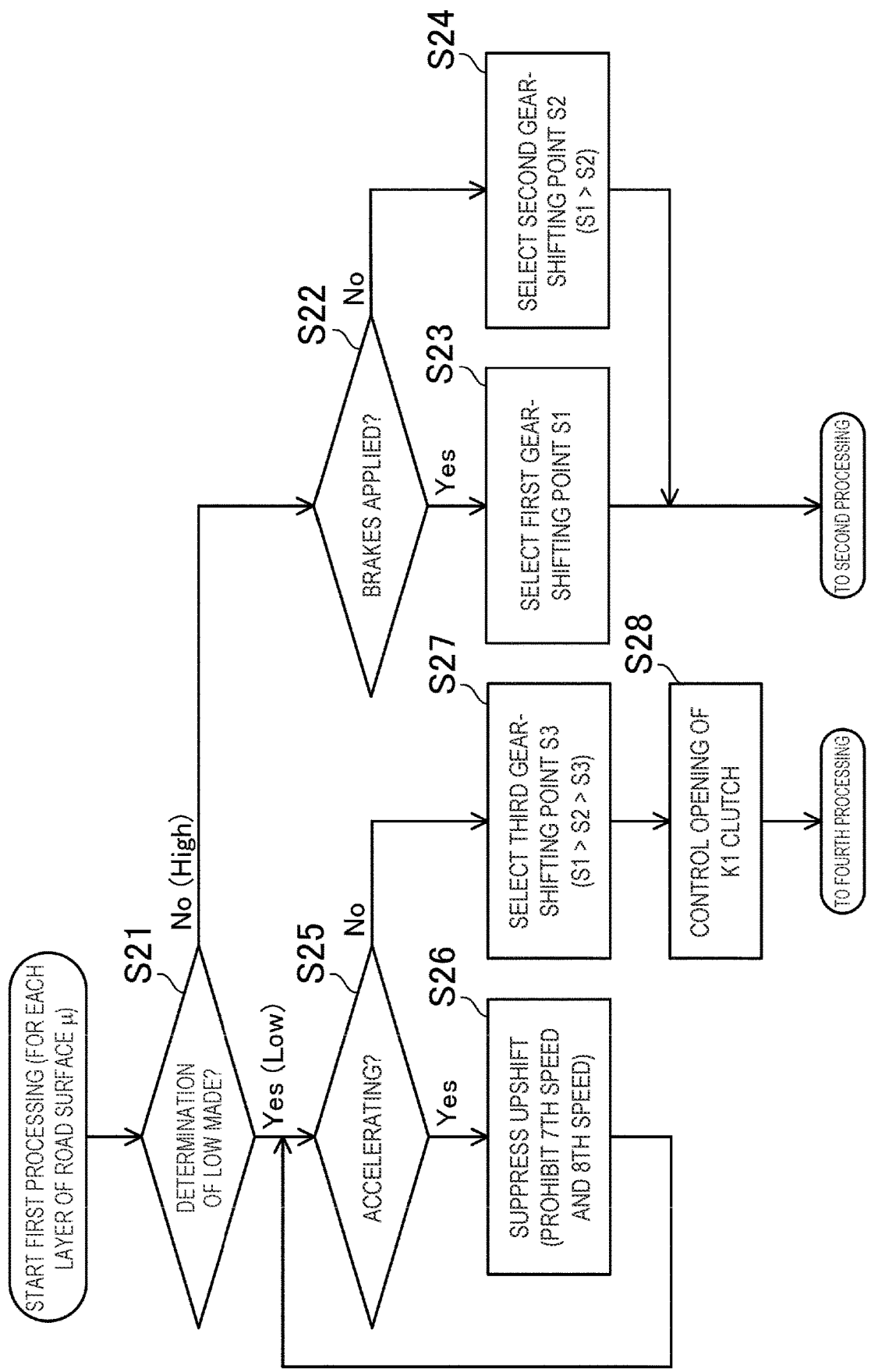
FIG. 6 is a flow chart of first processing.

FIG. 6 is a flow chart of the first processing. In step S21 after start of the process, the controller 20 determines whether or not the coefficient of friction is low. The controller 20 determines whether or not the coefficient of friction is lower than a predetermined level based on a vehicle speed, a wheel speed, a steering angle, and/or a yaw rate. When a result of the determination in step S21 is No or, in other words, when the coefficient of friction is not low, the process advances to step S22. When the result of the determination in step S21 is Yes or, in other words, when the coefficient of friction is low, the process advances to step S25.

When the coefficient of friction is not low or, in other words, when the grip of the wheels 2F and 2R is apt to stay within the circle of friction due to the coefficient of friction being high, the controller 20 executes normal gear-shifting control. First, in step S22, the controller 20 determines whether or not the driver is depressing the brake pedal 19. The controller 20 makes the determination based on a signal of the brake pedal sensor 55. When a result of the determination in step S22 is Yes or, in other words, when the driver is depressing the brake pedal 19, the process advances to step S23. When the result of the determination in step S22 is No or, in other words, when the driver is not depressing the brake pedal 19, the process advances to step S24.

When the driver is depressing the brake pedal 19, the controller 20 executes regenerative coordination control in which a part of a required braking force of the driver is covered by a regenerative braking torque of the motor 5. Note that the hydraulic pressure of the friction brakes 31 is reduced by an amount corresponding to the regenerative braking torque of the motor 5.

Figure 7:
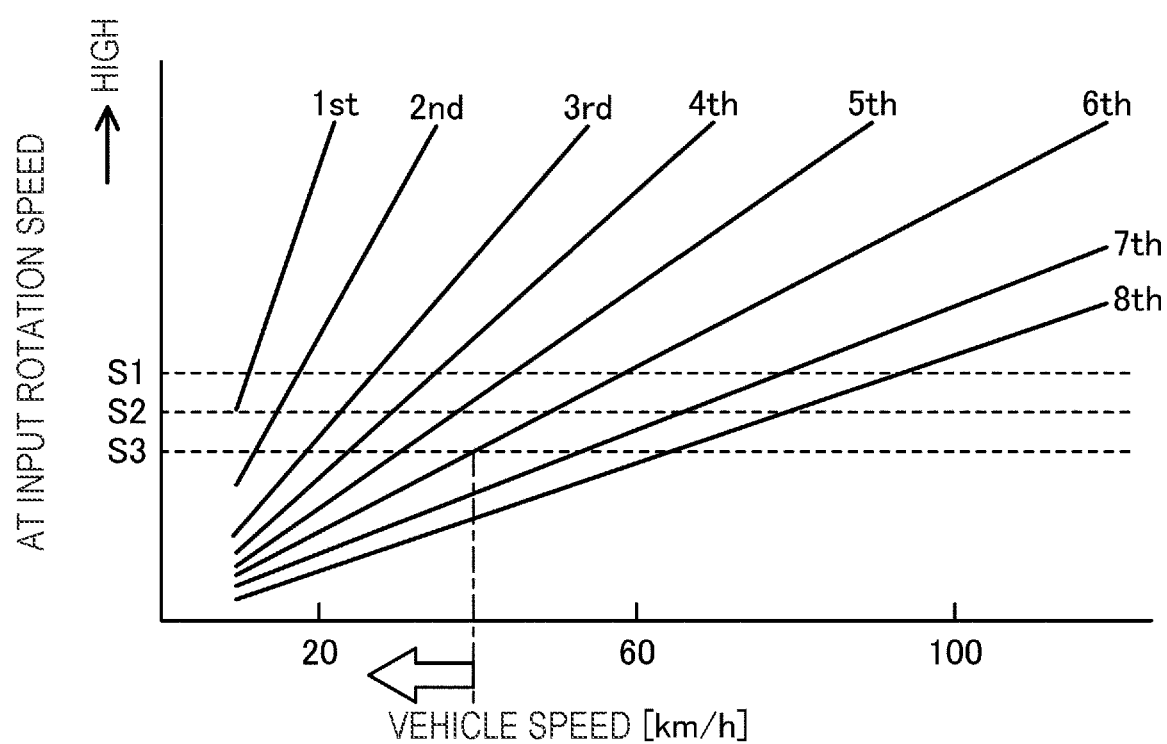
FIG. 7 shows a downshift point for each shift stage of the automatic transmission.

In step S23, the controller 20 selects a first gear-shifting point S1 as a downshift point of the automatic transmission 8. FIG. 7 illustrates a downshift point for each shift stage of the automatic transmission 8. In FIG. 7, an abscissa represents a vehicle speed and an ordinate represents the rotation speed of the input shaft 8a of the automatic transmission 8. The first gear-shifting point S1 is set to a constant rotation speed of the input shaft 8a regardless of the vehicle speed with respect to each shift stage. The first gear-shifting point S1 is higher than a second gear-shifting point S2 and a third gear-shifting point S3 to be described later. For example, when traveling at the sixth speed, since the rotation speed of the input shaft 8a of the automatic transmission 8 reaches the first gear-shifting point S1 when the vehicle speed is about less than 60 km/h, the automatic transmission 8 shifts down from the sixth speed to the fifth speed. Accompanying the downshift, the rotation speed of the input shaft of the automatic transmission 8 or, in other words, the rotation speed of the motor 5 becomes higher than the first gear-shifting point S1. When the driver is depressing the brake pedal 19 and the controller 20 is executing the regenerative coordination control, the rotation speed of the motor 5 performing a regeneration operation can be maintained at a high level by setting the downshift point to the first gear-shifting point S1. A high rotation speed of the motor increases a regeneration amount and, therefore, improves the fuel efficiency performance of the automobile 1.

When the driver is not depressing the brake pedal 19, the controller 20 does not perform the regenerative coordination control. The motor 5 imparts a regenerative braking torque corresponding to engine braking to the rear wheels 2R and performs a regeneration operation. In a decelerating state where the driver is not depressing the brake pedal 19, a change to an acceleration request may occur when the driver depresses the accelerator pedal 18. When the rotation speed of the input shaft 8a of the automatic transmission 8 is maintained at a high level due to setting the downshift point to the first gear-shifting point S1, there is a risk that a sufficient drive force cannot be secured upon the acceleration request by the driver.

In consideration thereof, in step S24, the controller 20 selects the second gear-shifting point S2 as a downshift point of the automatic transmission 8. As shown in FIG. 7, the rotation speed of the input shaft 8a of the automatic transmission 8 is lower at the second gear-shifting point S2 than at the first gear-shifting point S1. Accordingly, since the rotation speed of the input shaft 8a of the automatic transmission 8 during deceleration becomes relatively lower, a sufficient drive force can be secured upon the acceleration request by the driver.

After normal control in step S23 or step S24, the process makes a transition to the second processing.

Compared to normal control when the coefficient of friction is not low, the grip force of the wheels 2F and 2R is apt to exceed the circle of friction and the behavior of the automobile 1 tends to become unstable when the coefficient of friction is low. In consideration thereof, the controller 20 performs control for preventing the behavior of the automobile 1 from becoming unstable due to a gear-shifting operation of the automatic transmission 8.

First, in step S25, the controller 20 determines whether or not the automobile 1 is accelerating. When the automobile 1 is accelerating (in a case of Yes), the process makes a transition to step S26, but when the automobile 1 is not accelerating (in a case of No), the process makes a transition to step S27.

When the automobile 1 is accelerating, the automatic transmission 8 performs an upshift as the vehicle speed and/or the rotation speed of the input shaft 8*a* of the automatic transmission 8 increases. The accelerating automobile 1 eventually reaches deceleration, and the automatic transmission 8 performs a downshift during the deceleration. During a downshift of the automatic transmission 8, a torque fluctuation of the rear wheels 2R occurs due to a moment of inertia of the automatic transmission 8. When the coefficient of friction is low, there is a risk that the torque fluctuation of the rear wheels 2R which accompanies the downshift may make the behavior of the automobile 1 unstable. In consideration thereof, the controller 20 suppresses an upshift in step S26. Specifically, the controller 20 prohibits the automatic transmission 8 from shifting up from the sixth speed to the seventh speed and from the seventh speed to the eighth speed. In step S26, the automatic transmission 8 is shifted up to the sixth speed at a maximum. Limiting a highest-speed stage of the automatic transmission 8 means reducing a frequency of downshifts during subsequent deceleration. There are fewer opportunities for the behavior of the automobile 1 to be able to become unstable.

Step S27 corresponds to when the automobile 1 is decelerating. The automatic transmission 8 performs a downshift as the vehicle speed and/or the rotation speed of the input shaft 8*a* of the automatic transmission 8 decreases. In order to avoid, as much as possible, destabilization of the behavior of the automobile 1 which is attributable to a downshift, the controller 20 performs the downshift in a state where the vehicle speed is as low as possible. Specifically, the controller 20 selects the third gear-shifting point S3 as the downshift point of the automatic transmission 8. As shown in FIG. 7, the third gear-shifting point S3 is lower than the first gear-shifting point S1 and the second gear-shifting point S2.

As described earlier, since an upshift to the seventh speed and the eighth speed is prohibited, the highest-speed stage is the sixth speed. In addition, the downshift point is the third gear-shifting point S3. Therefore, in step S27, the automatic transmission 8 does not perform a downshift until the vehicle speed drops to around 40 km/h as indicated by a blank arrow in FIG. 7. Since a downshift at a high vehicle speed is not performed, the behavior of the automobile 1 can be prevented from becoming unstable.

In subsequent step S28, the controller 20 opens the K1 clutch when the rotation speed of the input shaft 8*a* of the automatic transmission 8 falls below the third gear-shifting point S3. As described earlier, the K1 clutch is a clutch made up of friction fastening elements of the automatic transmission 8 and, when the K1 clutch is opened, motive power transmission between the input shaft 8*a* and the output shaft 8*b* of the automatic transmission 8 is interrupted. Since opening of the K1 clutch reduces a torque which acts on the rear wheels 2R, destabilization of the behavior of the automobile 1 can be suppressed and, at the same time, engine stall due to a further decrease in the rotation speed of the engine 4 can be avoided.

After active control when the coefficient of friction is low, the process makes a transition to the fourth processing.

<Second Processing>

Figure 8:
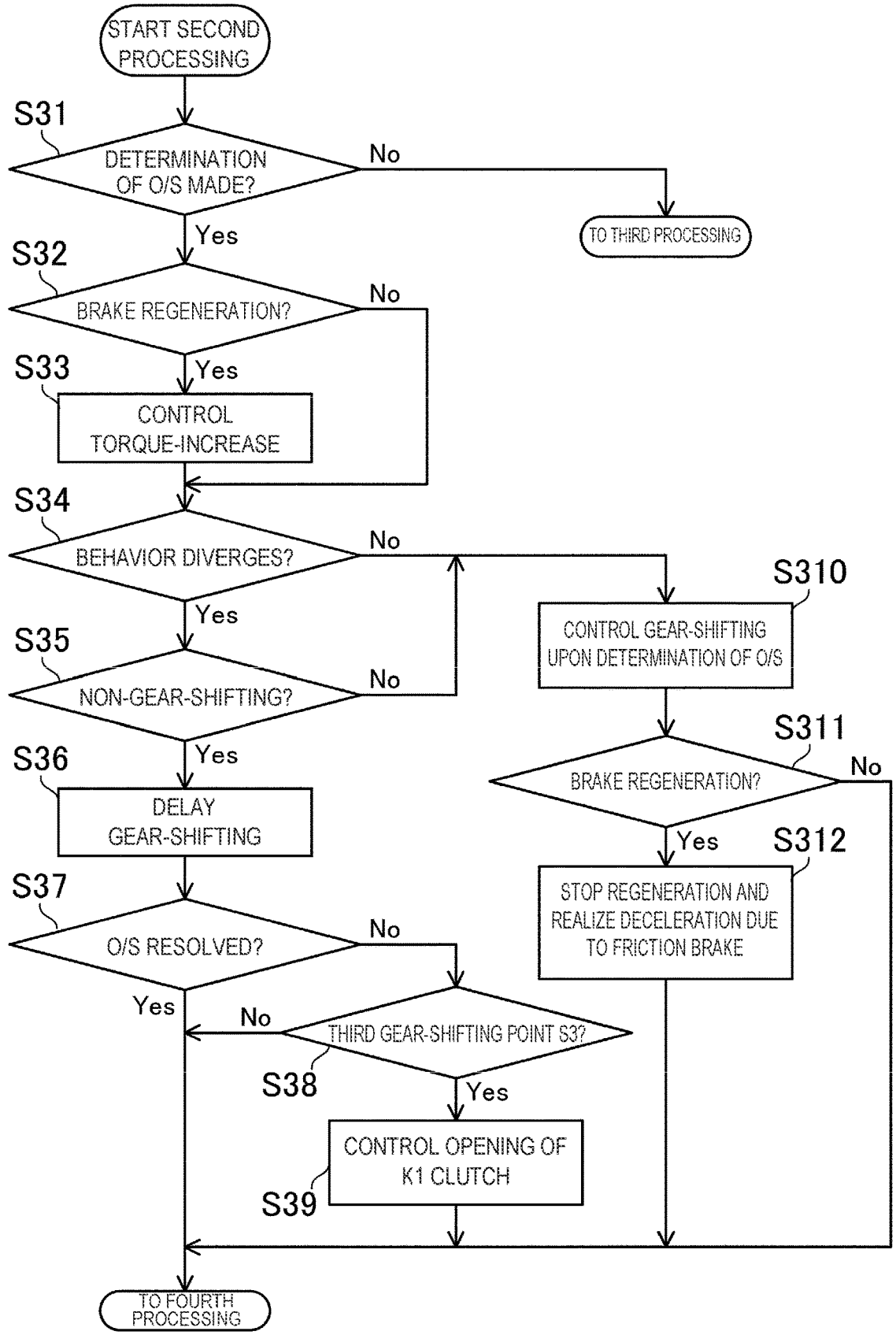
FIG. 8 is a flow chart of second processing.

FIG. 8 is a flow chart of the second processing. As described earlier, the second processing is passive control. In step S31 after start of the process, the controller 20 determines whether or not a determination of oversteering has been made. For example, the controller 20 determines whether or not the automobile 1 is in an oversteered state based on a deviation between an estimated yaw rate which can be calculated from the vehicle speed and the steering angle and an actual yaw rate based on a signal of the yaw rate sensor 54. The controller 20 may determine that the automobile 1 is in an oversteered state when the deviation between the estimated yaw rate and the actual yaw rate is equal to or larger than a predetermined value. When a result of the determination in step S31 is No or, in other words, when the automobile 1 is not in an oversteered state, passive control is not performed. The process advances to the third processing. On the other hand, when the result of the determination in step S31 is Yes or, in other words, when the automobile 1 is in an oversteered state, the process advances to step S32.

In step S32, the controller 20 determines whether or not brake regeneration is being performed. In other words, a determination of whether or not the driver is depressing the brake pedal 19 is made. When a result of the determination in step S32 is Yes, the process makes a transition to step S33, but when the result of the determination in step S32 is No, the process advances to step S34 without making a transition to step S33.

As described earlier, during deceleration when the driver is depressing the brake pedal 19, regenerative coordination control in which a part of a required braking force of the driver is covered by a regenerative braking torque of the motor 5 is executed. The regenerative braking torque of the motor 5 is only imparted to the rear wheels 2R of the automobile 1 which is a rear-wheel drive vehicle. Therefore, a lateral force of the rear wheels 2R decreases and the behavior of the automobile 1 is apt to fall into an oversteered state.

In consideration thereof, in step S33, the controller 20 executes torque-increase control. Specifically, an input torque of the input shaft 8*a* of the automatic transmission 8 is increased so as to eliminate the regenerative braking torque of the motor 5 having so far covered for a part of the braking force of the friction brakes 31. The torque-increase control corresponds to an end of the regenerative coordination control. The friction brake system 3 compensates for a braking force corresponding to the eliminated regenerative braking torque by the braking force of the friction brakes 31. Note that even after the regenerative coordination control ends, a regenerative braking torque corresponding to engine braking which accompanies releasing the accelerator remains and the regeneration operation of the motor 5 itself continues. Since a regeneration amount is secured even when the automobile 1 is in an oversteered state, an advantage is gained in terms of improving fuel efficiency performance of the automobile 1.

Since the regenerative braking torque having been imparted to the rear wheels 2R decreases and a lateral force of the rear wheels 2R is secured, the oversteered state of the automobile 1 moves toward resolution. The deviation between the estimated yaw rate and the actual yaw rate moves toward reduction. Stabilization of the behavior of the automobile 1 can be achieved while securing as much of a regeneration amount as possible. After step S33, the process advances to step S34.

Note that when brake regeneration is not performed or, in other words, during deceleration where the driver is not depressing the brake pedal 19 in step S32, since second regeneration control of performing regeneration control corresponding to engine braking is being performed and regenerative coordination control is not being performed, the torque increase in step S33 is not performed. Even when the process makes a transition from step S32 to step S34, the motor 5 performs a regeneration operation with a regenerative braking torque corresponding to engine braking which accompanies releasing the accelerator.

In step S34, the controller 20 determines whether or not an unstable behavior of the automobile 1 is diverging. For example, the controller 20 may determine that the unstable behavior of the automobile 1 is diverging when the deviation between the estimated yaw rate and the actual yaw rate is expanding. When a result of the determination in step S34 is Yes, the process makes a transition to step S35. When the result of the determination in step S34 is No, the process makes a transition to step S310.

In step S35, the controller 20 determines whether or not the automatic transmission 8 is not gear-shifting (in other words, non-gear-shifting). When the automatic transmission 8 is not gear-shifting (in other words, in a case of Yes), the process advances to step S36. When the automatic transmission 8 is gear-shifting (in other words, in a case of No), the process advances to step S310.

In step S36, the controller 20 delays a downshift of the automatic transmission 8. In other words, the controller 20 prohibits a downshift of the automatic transmission 8 until the oversteered state of the automobile 1 is resolved even if the traveling state of the automobile 1 has reached a downshift point. Since a downshift of the automatic transmission 8 accompanies a torque fluctuation of the rear wheels 2R and there is a risk that the behavior of the automobile 1 is further destabilized as described earlier, prohibiting a downshift prevents the behavior of the automobile 1 from becoming further unstable. Note that the downshift point is the first gear-shifting point S1 or the second gear-shifting point S2 in normal gear-shifting control.

In subsequent step S37, the controller 20 determines whether or not the oversteered state of the automobile 1 has been resolved. The controller 20 may determine that the oversteered state of the automobile 1 has been resolved when the deviation between the estimated yaw rate and the actual yaw rate falls below the predetermined value. When the oversteered state of the automobile 1 has been resolved, the process advances to the fourth processing. When the oversteered state of the automobile 1 has not been resolved, the process advances to step S38.

In step S38, the controller 20 determines whether or not the rotation speed of the input shaft 8a of the automatic transmission 8 has reached the third gear-shifting point S3. When the rotation speed of the input shaft 8a has reached the third gear-shifting point S3, the process advances to step S39, but when the rotation speed of the input shaft 8a has not reached the third gear-shifting point S3, the process advances to the fourth processing. As described earlier, the third gear-shifting point S3 is a downshift point which takes an engine stall into consideration.

In step S39, the controller 20 opens the K1 clutch of the automatic transmission 8 in a similar manner to step S28 of the first processing. Accordingly, an engine stall can be suppressed. Subsequently, the process advances to the fourth processing.

In this manner, when the automobile 1 falls into an oversteered state during deceleration by regenerative coordination control or second regeneration control, a downshift of the automatic transmission 8 is delayed. The behavior of the automobile 1 is prevented from becoming further unstable due to the downshift. In addition, while the rotation speed of the input shaft 8a of the automatic transmission 8 drops and a risk of an engine stall arises when a downshift of the automatic transmission 8 is delayed, since motive power transmission between the input shaft 8a and the output shaft 8b of the automatic transmission 8 is interrupted once the rotation speed of the input shaft 8a of the automatic transmission 8 reaches the limited rotation speed (in other words, the third gear-shifting point S3), an engine stall can be suppressed.

On the other hand, when the automobile 1 is in an oversteered state and the automatic transmission 8 is performing a downshift (a case where the result of step S35 is No) or when a delayed downshift is performed after the oversteered state of the automobile 1 is resolved (a case where the result of step S34 is No), the controller 20 executes gear-shifting control upon a determination of oversteering in step S310. Details of the gear-shifting control will be provided later. In simple terms, a torque of the rear wheels 2R fluctuates due to inertia of the automatic transmission 8 which accompanies a downshift. In the gear-shifting control upon a determination of oversteering in step S310, an input torque of the input shaft 8a of the automatic transmission 8 is increased as compared to during normal gear-shifting control or, in other words, an input torque during a non-determination of oversteering so that a torque fluctuation of the rear wheels 2R corresponding to the amount of inertia is suppressed. As a result of a relative increase in an amount of increase of the input torque, a torque fluctuation is suppressed even when a downshift is performed and destabilization of the behavior of the automobile 1 attributable to the downshift is prevented from deteriorating.

In subsequent step S311, the controller 20 determines whether or not brake regeneration is being performed, and when a result of the determination is Yes meaning that brake regeneration is being performed, the process advances to step S312. On the other hand, when the result of the determination is No meaning that brake regeneration is not being performed, the process advances from step S311 to the fourth processing.

In step S312, the controller 20 stops the regenerative coordination control, secures, with the friction brakes 31, the braking force having been covered by the regenerative braking torque of the motor 5, and achieves deceleration commensurate with braking requested by the driver. Note that even after the regenerative coordination control ends, a regenerative braking torque corresponding to engine braking which accompanies releasing the accelerator remains and the regeneration operation of the motor 5 itself continues.

<Gear-Shifting Processing>

Figure 9:
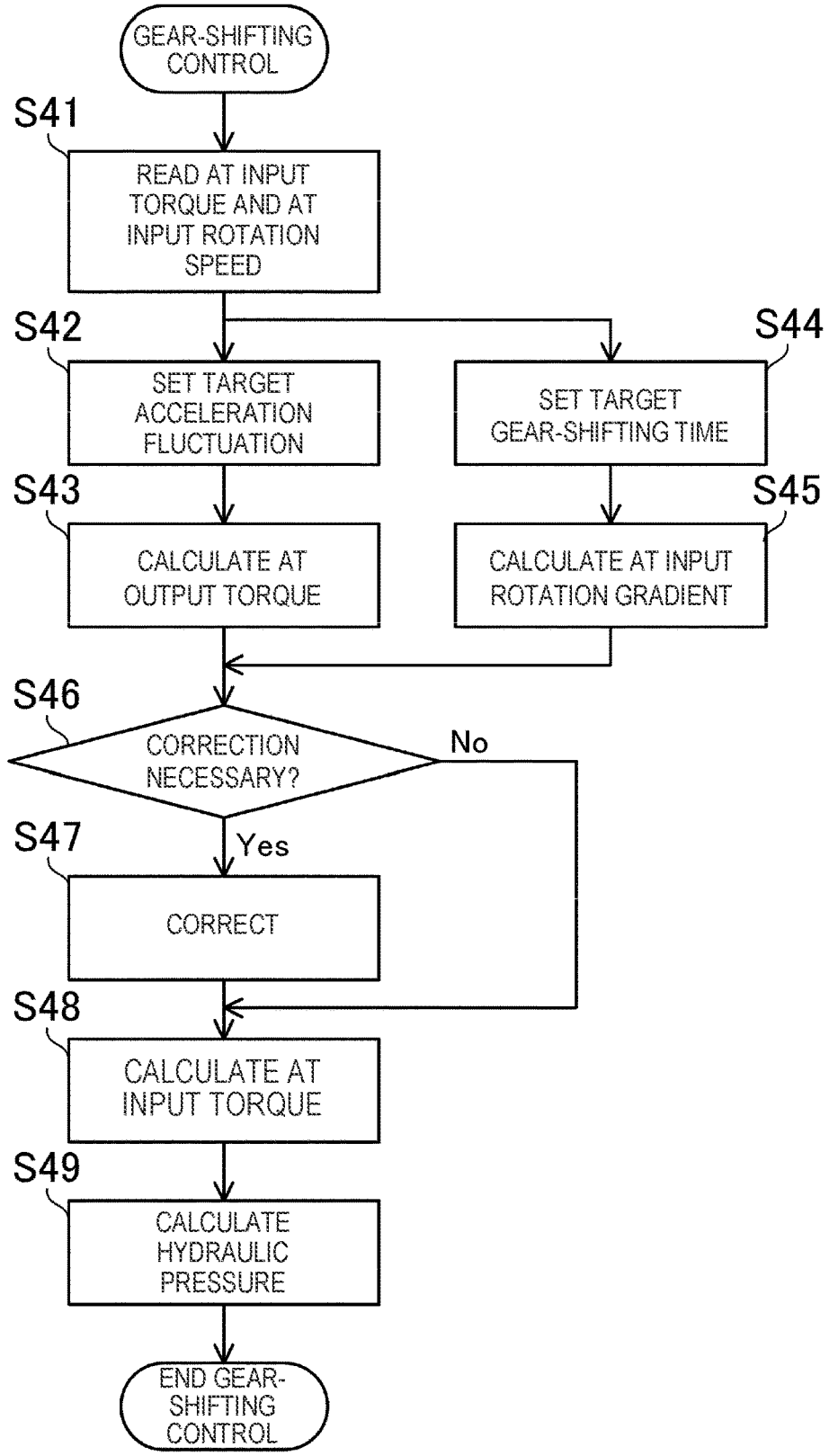
FIG. 9 is a flow chart of gear-shifting control.

FIG. 9 is a flow chart of gear-shifting control. In step S41 after start of the process, the controller 20 reads an AT input torque and the AT input rotation speed. The process subsequently advances to each of step S42 and step S44.

In step S42, the controller 20 sets a target acceleration fluctuation during gear-shifting of the automatic transmission 8. The target acceleration fluctuation is a target value of an acceleration fluctuation which is created in the automobile 1 during gear-shifting of the automatic transmission 8. Basically, the target acceleration fluctuation is set such that the higher the AT input rotation speed, the larger the target acceleration fluctuation. When the AT input rotation speed is high, causing the driver to feel an upshift or a downshift is allowed. The target acceleration fluctuation is determined according to a shift stage and the AT input rotation speed of the automatic transmission 8 based on a relational expression or a map set with respect to each of an upshift and a downshift.

In subsequent step S43, the controller 20 calculates an AT output torque from the set target acceleration fluctuation. The AT output torque is a torque fluctuation of the output shaft 8b during gear-shifting of the automatic transmission 8.

On the other hand, in step S44, the controller 20 sets a target gear-shifting time during gear-shifting of the automatic transmission 8. Basically, the target gear-shifting time is set such that the higher the AT input rotation speed, the shorter the target gear-shifting time. When the AT input rotation speed is high, it is required that an upshift or a downshift be promptly completed. The target gear-shifting time is determined from the shift stage and the AT input rotation speed of the automatic transmission 8 based on a relational expression or a map set with respect to each of an upshift and a downshift.

In subsequent step S45, the controller 20 calculates an AT input rotation gradient from the set target gear-shifting time. The AT input rotation gradient is a change rate of the rotation speed of the input shaft 8a during gear-shifting of the automatic transmission 8.

After step S43 and step S45, the process makes a transition to step S46. In step S46, the controller 20 determines whether or not a correction of the calculated AT output torque and/or the calculated AT input rotation gradient is necessary. When the automobile 1 performs gear-shifting in an oversteered state as in step S310 of the second processing described earlier, a torque fluctuation of the rear wheels 2R which accompanies a downshift must be suppressed in order to stabilize the behavior of the automobile 1. In this case, in step S46, the controller 20 determines that a correction is necessary. When a result of the determination in step S46 is Yes, the process advances to step S47 and a correction of the calculated AT output torque and/or the calculated AT input rotation gradient is performed. Specifically, in gear-shifting control upon a determination of oversteering, a correction is performed so that the torque fluctuation of the rear wheels 2R is suppressed or, in other words, the AT output torque becomes flat. During a determination of an oversteered state, the target acceleration fluctuation is set smaller than during a non-determination of an oversteered state. After the correction, the process advances to step S48. On the other hand, when a result of the determination in step S46 is No or, in other words, in normal gear-shifting control where a correction is unnecessary, the process advances to step S48 instead of advancing to step S47.

Note that even in first coordinated gear-shifting control in step S54 and in second coordinated gear-shifting control in step S55 of the third processing to be described later, the correction of step S47 is executed and the torque fluctuation of the rear wheels 2R during gear-shifting is suppressed.

In step S48, the controller 20 calculates the AT input torque based on the AT output torque and the AT input rotation gradient. The AT input torque is a torque input to the input shaft 8a of the automatic transmission 8 and the AT input torque is mainly adjusted by the motor 5. When performing a downshift in step S310 of the second processing described earlier, as a result of the correction in step S47 being performed, an amount of increase of the AT input torque is increased as compared to an amount of increase during a normal downshift (in other words, during a non-determination of an oversteered state and without any correction).

Once the AT input torque is calculated, in subsequent step S49, the controller 20 calculates hydraulic pressure to be supplied to the friction fastening elements of the automatic transmission 8 so as to correspond to the calculated AT input torque. According to the set hydraulic pressure, the automatic transmission 8 performs a downshift or an upshift due to the friction fastening elements being supplied with the hydraulic pressure.

<Third Processing>

Figure 10:
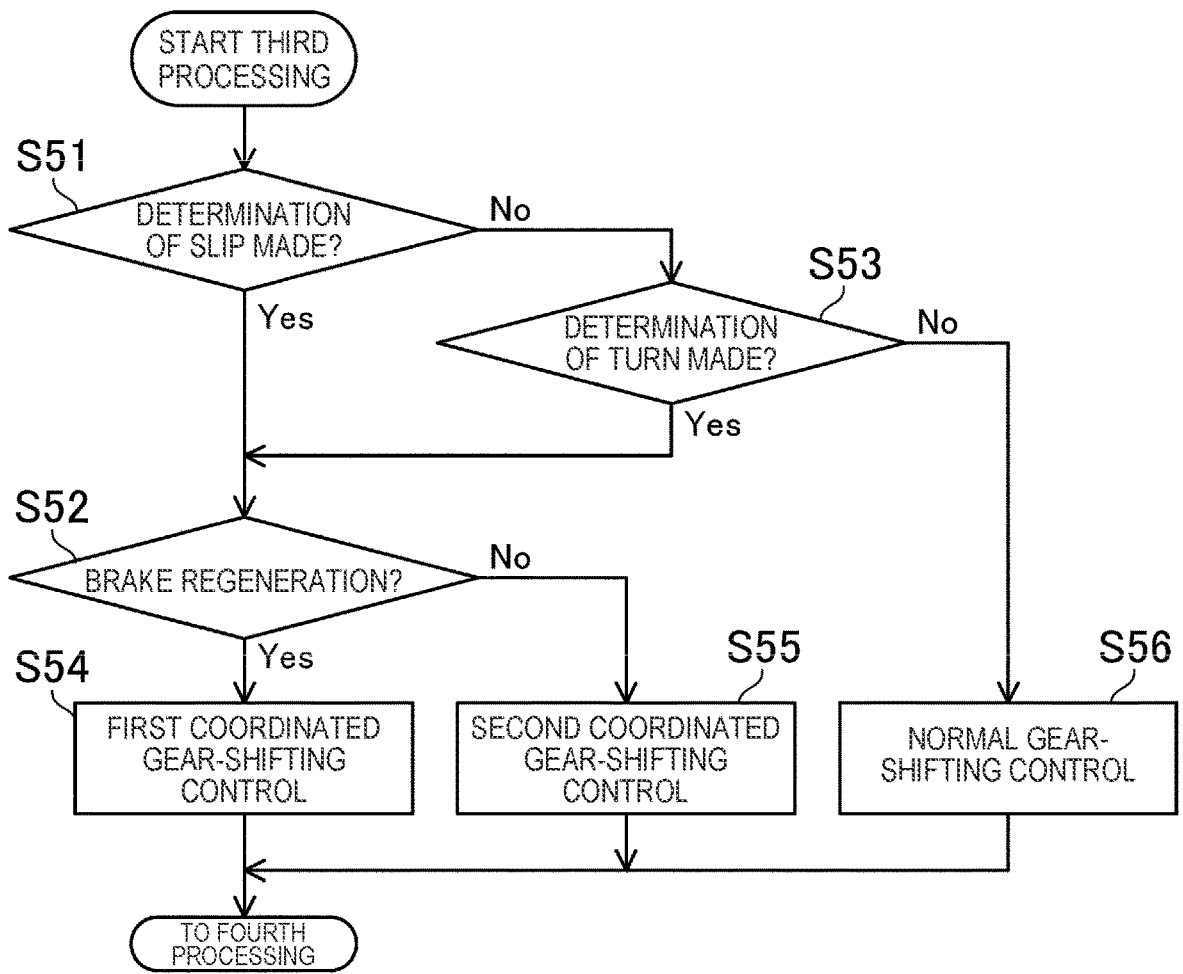
FIG. 10 is a flow chart of third processing.

FIG. 10 is a flow chart of the third processing. As described earlier, the third processing is active control. In step S51 after start of the process, the controller 20 determines whether or not a slip determination has been made. The controller 20 may determine a slip state of each of the wheels 2F and 2R based on, for example, the vehicle speed and the wheel speed. When a result of the determination in step S51 is Yes or, in other words, when it is determined that the wheels 2F and 2R are slipping, the process advances to step S52, and when the result of the determination in step S51 is No or, in other words, when it is determined that the wheels 2F and 2R are not slipping, the process advances to step S53.

In step S53, the controller 20 determines whether or not a turn determination has been made. The controller 20 may determine a turn state of the automobile 1 based on, for example, the steering angle and the yaw rate. When a result of the determination in step S53 is Yes or, in other words, when it is determined that the automobile 1 is in a turn state, the process advances to step S52, and when the result of the determination in step S53 is No or, in other words, when it is determined that the automobile 1 is not in a turn state, the process advances to step S56.

In step S56, the controller 20 executes normal gear-shifting control. In other words, since the wheels 2F and 2R are not in a slip state and the automobile 1 is in a state of straight travel, it is unlikely that the automobile 1 will become unstable during gear-shifting of the automatic transmission 8. In step S56, the correction of step S47 in the flow of the gear-shifting control shown in FIG. 9 is not performed.

On the other hand, in steps S52, S54, and S55, the wheels 2F and 2R are in a slip state or the automobile 1 is in a turn state, and when the automatic transmission 8 performs gear-shifting in this state and a torque of the rear wheels 2R fluctuates, there is a risk that the behavior of the automobile 1 may become unstable. In consideration thereof, the controller 20 performs control for preventing the behavior of the automobile 1 from becoming unstable.

First, in step S52, the controller 20 determines whether or not brake regeneration is being performed. When the result of the determination is Yes meaning that brake regeneration is being performed, the process advances to step S54. On the other hand, when the result of the determination is No meaning that brake regeneration is not being performed, the process advances to step S55.

When brake regeneration is being performed, the controller 20 executes coordinated control of the friction brake system 3, the motor 5, and the automatic transmission 8. Specifically, in step S54, the automatic transmission 8 executes gear-shifting control so that the torque fluctuation of the rear wheels 2R which accompanies gear-shifting is suppressed. In step S54, the correction of step S47 in the flow of the gear-shifting control shown in FIG. 9 is performed. In addition, the friction brake system 3 and/or the motor 5 impart a torque to the rear wheels 2R so as to compensate for the torque fluctuation during gear-shifting. As a result, the behavior of the automobile 1 is prevented from becoming unstable.

When brake regeneration is not being performed, the controller 20 executes coordinated control of the motor 5 and the automatic transmission 8. In step S55, the automatic transmission 8 executes gear-shifting control so that the torque fluctuation of the rear wheels 2R which accompanies gear-shifting is suppressed. Even in step S55, the correction of step S47 in the flow of the gear-shifting control shown in FIG. 9 is performed. In addition, the motor 5 imparts a torque to the rear wheels 2R so as to compensate for the torque fluctuation during gear-shifting. As a result, the behavior of the automobile 1 is prevented from becoming unstable.

After the third processing, the process advances to the fourth processing.

<Fourth Processing>

Figure 11:
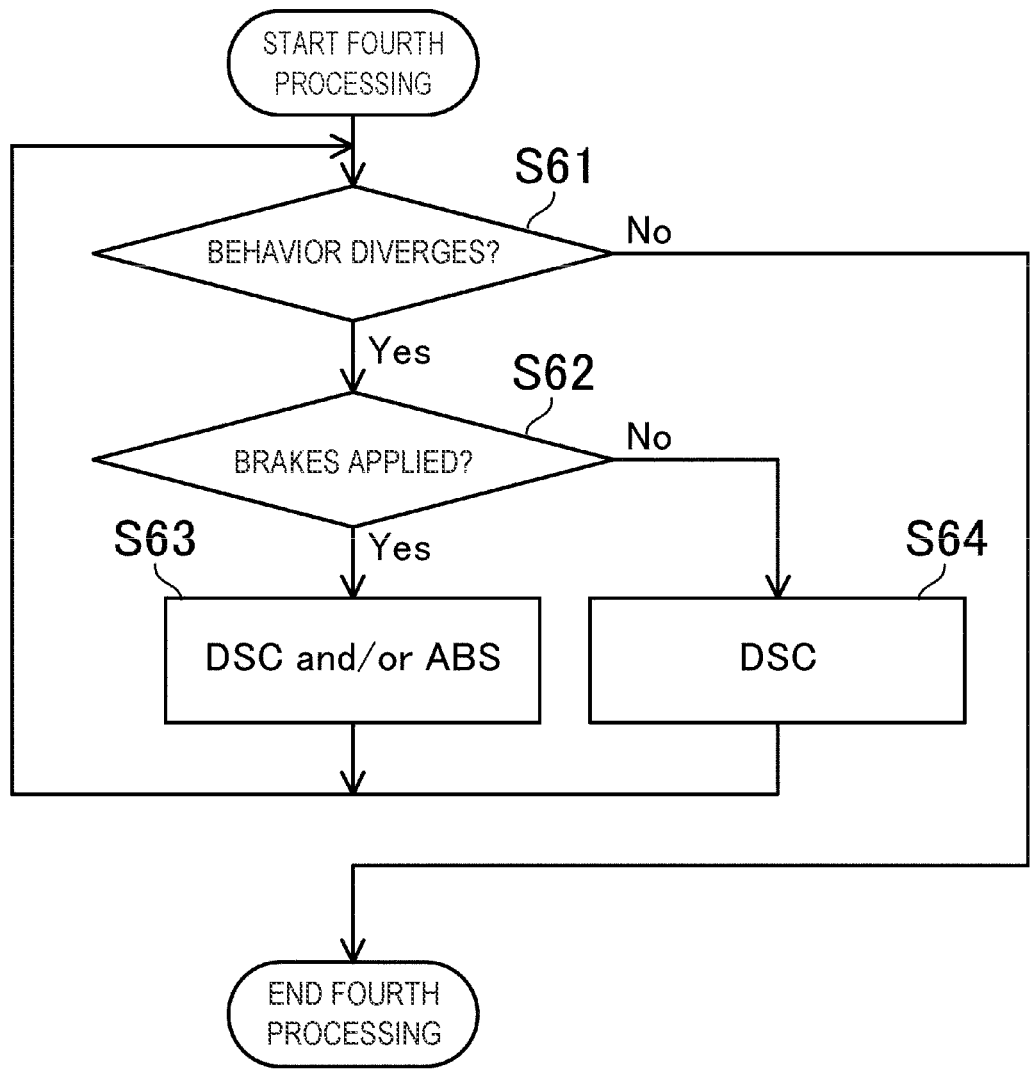
FIG. 11 is a flow chart of fourth processing.

FIG. 11 is a flow chart of the fourth processing. The fourth processing is DSC/ABS control. In step S61 after the start of the process, the controller 20 determines whether or not an unstable behavior of the automobile 1 is diverging. When an unstable behavior of the automobile 1 is diverging, the process advances to step S62. When an unstable behavior of the automobile 1 is not diverging, since DSC/ABS control is unnecessary, the fourth processing is ended.

In step S62, the controller 20 determines whether or not brakes are applied. When the driver is depressing the brake pedal 19 (in other words, when the result of the determination is Yes), the process advances to step S63, but when the driver is not depressing the brake pedal 19 (in other words, when the result of the determination is No), the process advances to step S64.

In step S63, since the brakes are applied, DSC control or ABS control is executed to cause the unstable behavior of the automobile 1 to converge. In step S64, since the brakes are not applied, DSC control is executed to cause the unstable behavior of the automobile 1 to converge.

Once the unstable behavior of the automobile 1 converges due to control intervention in step S63 or step S64, the fourth processing ends.

<Control Example>

Next, the second processing will be described with reference to time charts shown in FIGS. 12 to 14. Each time chart includes changes in a brake pedal operation amount and brake fluid pressure, a change in a steering angle (a measured value of the steering angle sensor 53), a change in a gear stage, a change in a yaw rate (a measured value of the yaw rate sensor 54), a change in a regenerative braking torque, a change in the AT input torque, a change in a transmission ratio of the automatic transmission 8, and a change in the AT input rotation speed.

Figure 12:
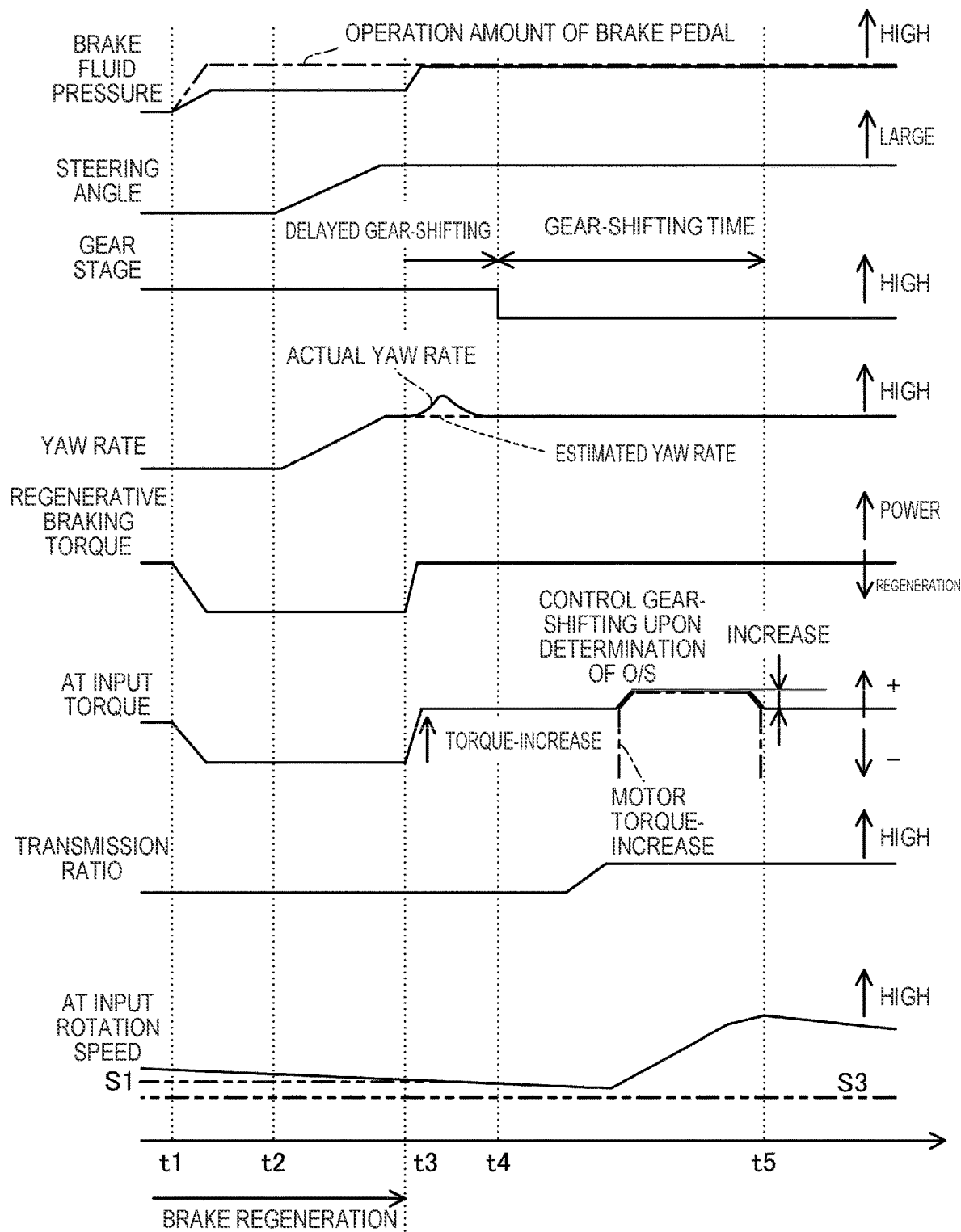
FIG. 12 is a time chart of a case where a downshift is delayed.

First, FIG. 12 is a time chart in a case where a downshift of the automatic transmission 8 is prohibited until an oversteered state of the automobile 1 is resolved. At a time t1, the driver starts to depress the brake pedal 19. The controller 20 starts regenerative coordination control. Based on a signal from the controller 20, the friction brake system 3 reduces brake fluid pressure with respect to an operation amount of the brake pedal 19 which is indicated by a long dashed dotted line. A braking force of the friction brakes 31 decreases by a corresponding amount. The motor 5 increases a regenerative braking torque so as to compensate for the decreased amount of the braking force of the friction brakes 31. Accordingly, since regenerative energy can be secured, an advantage is gained in terms of improving fuel efficiency of the automobile 1. Since the regenerative braking torque increases, a torque input to the input shaft 8a of the automatic transmission 8 decreases.

At a time t2, the driver starts to steer the steering wheel 110. Accordingly, the steering angle gradually increases. The automobile 1 starts to turn and the yaw rate gradually increases.

At a time t3, the automobile 1 reaches an oversteered state and a deviation between an actual yaw rate and an estimated yaw rate increases. In order to end the regenerative coordination control, the controller 20 increases the input torque of the input shaft 8a of the automatic transmission 8 so as to eliminate the regenerative braking torque of the motor 5 having so far covered for a part of the braking force of the friction brakes 31 (torque increase, step S33). Accordingly, the regenerative braking torque decreases. Note that even at the time t3 and thereafter, the regenerative braking torque corresponding to engine braking which accompanies releasing the accelerator remains and the regeneration operation of the motor 5 itself continues. In addition, the hydraulic pressure of the friction brakes 31 is increased so as to compensate for the decrease in the regenerative braking torque of the motor 5.

As the automobile 1 decelerates, the AT input rotation speed gradually drops. At the time t3 or thereafter, even if the AT input rotation speed reaches the first gear-shifting point S1 or, in other words, a gear-shifting point which is set in the case of regenerative coordination control, the controller 20 does not allow the automatic transmission 8 to execute a downshift. A downshift of the automatic transmission 8 is delayed (step S36).

Since the regenerative braking torque having been imparted to the rear wheels 2R decreases and a lateral force of the rear wheels 2R is secured due to the torque increase described earlier, the oversteered state of the automobile 1 moves toward resolution. At a time t4, when the oversteered state of the automobile 1 is resolved, the controller 20 causes the automatic transmission 8 to execute the downshift which has been delayed (a transition from step S34 to step S310). Specifically, the input torque of the input shaft 8a of the automatic transmission 8 is increased as compared to during normal gear-shifting control by increasing the torque of the motor 5 (refer to arrow indicating "increase"). Accordingly, since a torque fluctuation of the rear wheels 2R corresponding to an inertia during the downshift is suppressed, the behavior of the automobile 1 can be prevented from becoming unstable once again immediately after the resolution of the oversteered state.

In addition, at a time t5, the downshift of the automatic transmission 8 ends.

Note that during a downshift of the automatic transmission 8 after the resolution of the oversteered state of the automobile 1, normal gear-shifting control may be executed instead of gear-shifting control upon a determination of oversteering. In other words, an increase in the torque of the motor 5 during the downshift may be suppressed.

Figure 13:
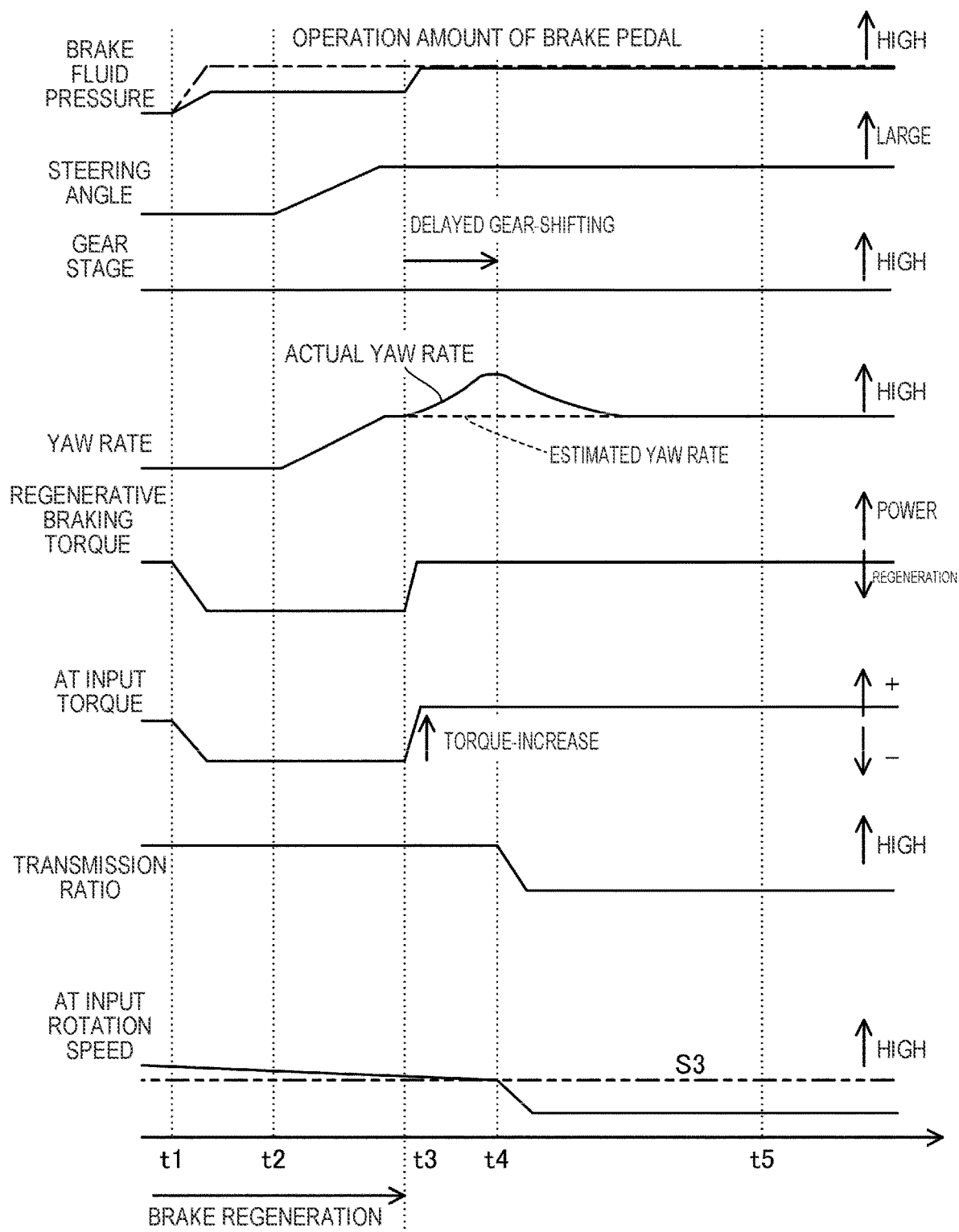
FIG. 13 is a time chart of a case where, as a result of delaying a downshift, a K1 clutch of the automatic transmission is opened.

FIG. 13 is a time chart in a case where a downshift of the automatic transmission 8 is prohibited until an oversteered state of the automobile 1 is resolved. The time chart in FIG. 13 differs from the time chart in FIG. 12 in that the AT input rotation speed reaches the third gear-shifting point S3.

Even in the time chart in FIG. 13, the driver starts depressing the brake pedal 19 at the time t1, the driver starts to steer the steering wheel 110 at the time t2, and the automobile 1 reaches an oversteered state at the time t3 in a similar manner to the time chart in FIG. 12. In order to end the regenerative coordination control, the controller 20 increases the input torque of the input shaft 8a of the automatic transmission 8 so as to eliminate the regenerative braking torque of the motor 5 having so far covered for a part of the braking force of the friction brakes 31 (torque increase). Accordingly, the regenerative braking torque decreases. Note that even at the time t3 and thereafter, the regeneration operation of the motor 5 itself continues. Gear-shifting of the automatic transmission 8 is delayed.

As the automobile 1 decelerates, the AT input rotation speed gradually drops and, at the time t4, the AT input rotation speed reaches the third gear-shifting point S3. The third gear-shifting point S3 is a downshift point which takes an engine stall into consideration. The controller 20 opens the K1 clutch of the automatic transmission 8. Accordingly, the AT input rotation speed decreases and a transmission ratio which is a velocity ratio between the input shaft 8a and the output shaft 8b of the automatic transmission 8 decreases.

Note that the oversteered state is resolved by a torque increase of the input shaft 8a. After the resolution of the oversteered state, the automatic transmission 8 performs a downshift.

Figure 14:
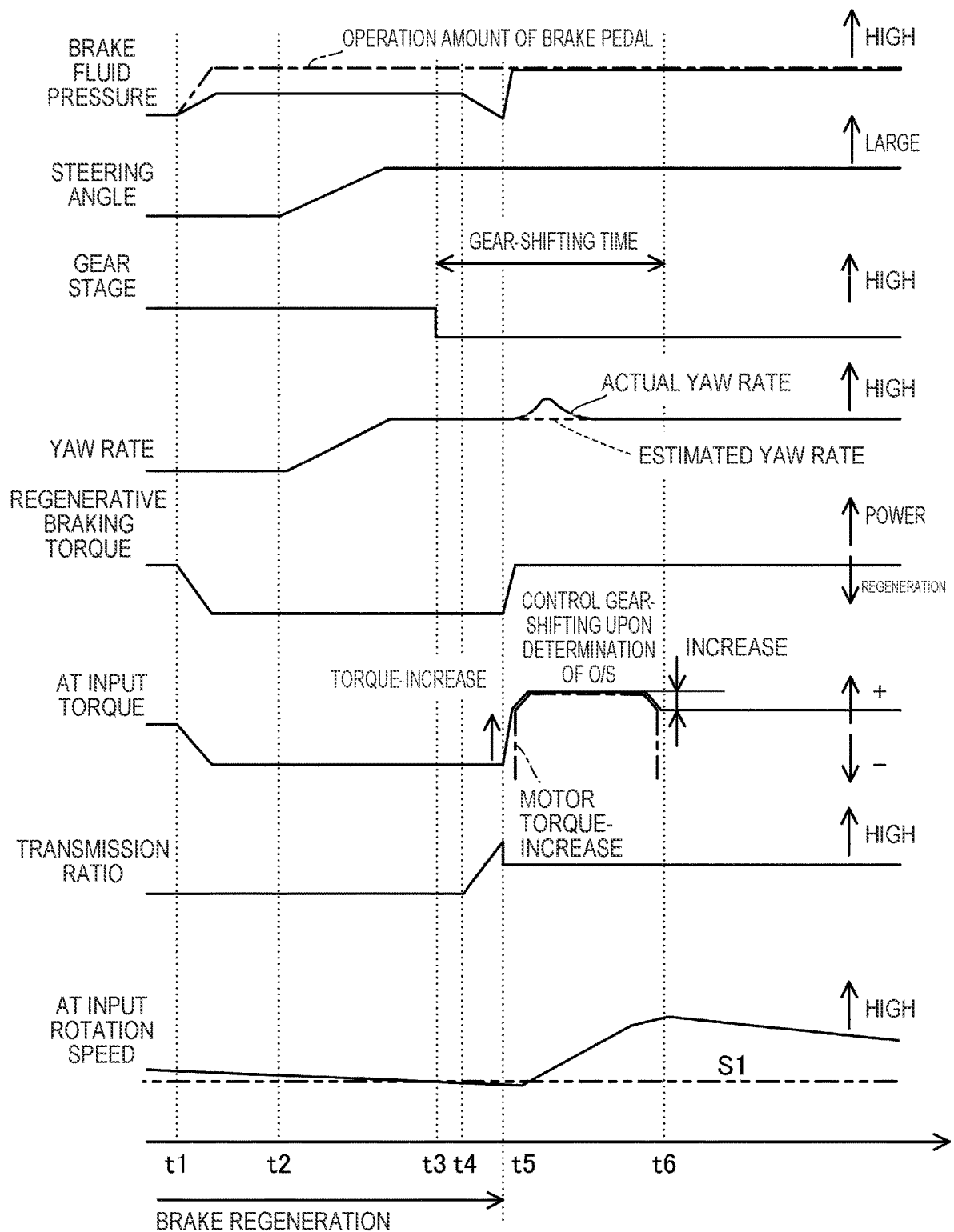
FIG. 14 is a time chart of a case where oversteering is determined during a downshift.

FIG. 14 is a time chart in a case where the automobile 1 reaches an oversteered state during gear-shifting of the automatic transmission 8. Even in the time chart in FIG. 14, the driver starts depressing the brake pedal 19 at the time t1 and the driver starts to steer the steering wheel 110 at the time t2 in a similar manner to the time chart in FIG. 12. The controller 20 performs regenerative coordination control.

At the time t3, since the AT input rotation speed has reached the first gear-shifting point S1, the automatic transmission 8 executes a downshift. Since the automobile 1 is turning, the first coordinated gear-shifting control of the third processing (step S54) is executed. As illustrated in FIG. 14, the hydraulic pressure of the friction brakes 31 is adjusted at the time t4 or thereafter in accordance with the downshift of the automatic transmission 8.

At the time t5 during the gear-shifting, the automobile 1 reaches an oversteered state. As in steps S310 to S312 in the second processing, in order to stop the regenerative coordination control, the controller 20 increases the input torque of the input shaft 8a of the automatic transmission 8 (torque increase) and, at the same time, increases the input torque of the input shaft 8a of the automatic transmission 8 as compared to during normal gear-shifting control by increasing the torque of the motor 5. The torque increase for stopping the regenerative coordination control and the torque increase for gear-shifting may be substantially performed at the same time or performed at staggered timings. By securing a lateral force of the rear wheels 2R and suppressing a torque fluctuation during gear-shifting, destabilization of the behavior of the automobile 1 is prevented from deteriorating. Note that the hydraulic pressure of the friction brakes 31 is increased so as to compensate for the decrease in the regenerative braking torque of the motor 5. In addition, the motor 5 performs a regeneration operation with a regenerative braking torque corresponding to engine braking.

Subsequently, at a time t6, the downshift of the automatic transmission 8 ends.

Modification

Figure 15:
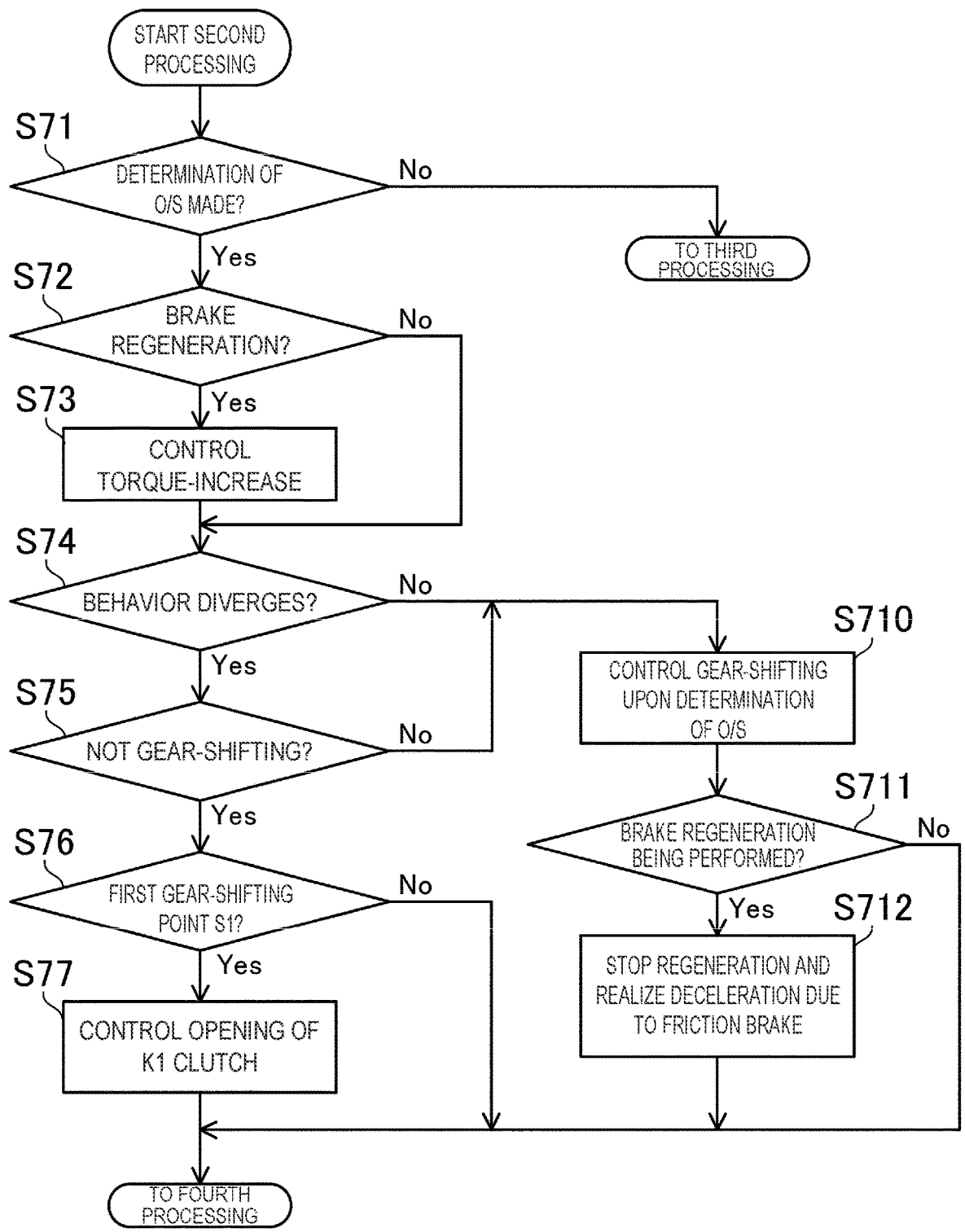
FIG. 15 is a flow chart related to a modification of the second processing.

FIG. 15 shows a modification of the second processing. The modification differs from the flow in FIG. 8 in that a downshift is not delayed. In step S71 after start of the process, the controller 20 determines whether or not a determination of oversteering has been made. When a result of the determination in step S71 is No, passive control is not performed. When a result of the determination in step S71 is Yes, the process advances to step S72.

In step S72, the controller 20 determines whether or not brake regeneration is being performed. When a result of the determination in step S72 is Yes, the process makes a transition to step S73, but when the result of the determination in step S72 is No, the process advances to step S74 without making a transition to step S73.

In step S73, the controller 20 executes torque-increase control. Accordingly, the regenerative coordination control ends. Since the regenerative braking torque having been imparted to the rear wheels 2R decreases and a lateral force of the rear wheels 2R is secured, the oversteered state of the automobile 1 moves toward resolution. After step S73, the process advances to step S74. In step S74 or thereafter, the motor 5 performs a regeneration operation with a regenerative braking torque corresponding to engine braking which accompanies releasing the accelerator. Even when the automobile 1 is in an oversteered state, since as much of a regeneration amount as possible is secured, an advantage is gained in terms of improving fuel efficiency performance of the automobile 1.

In step S74, the controller 20 determines whether or not an unstable behavior of the automobile 1 is diverging. When a result of the determination in step S74 is Yes, the process makes a transition to step S75. When the result of the determination in step S74 is No, the process makes a transition to step S710.

In step S75, the controller 20 determines whether or not the automatic transmission 8 is not gear-shifting. When the automatic transmission 8 is not gear-shifting (in other words, in a case of Yes), the process advances to step S76. When the automatic transmission 8 is gear-shifting (in other words, in a case of No), the process advances to step S710.

In step S76, the controller 20 determines whether or not the rotation speed of the input shaft 8a of the automatic transmission 8 has reached the first gear-shifting point S1. When the rotation speed of the input shaft 8a has reached the first gear-shifting point S1, the process advances to step S77, but when the rotation speed of the input shaft 8a has not reached the first gear-shifting point S1, the process advances to the fourth processing. As described earlier, the first gear-shifting point S1 is a downshift point when regenerative coordination control is being executed. Note that in step S76, the controller 20 may determine whether or not the rotation speed of the input shaft 8a of the automatic transmission 8 has reached the second gear-shifting point S2.

In step S77, the controller 20 opens the K1 clutch of the automatic transmission 8. Since a downshift of the automatic transmission 8 is not performed, destabilization of the behavior of the automobile 1 attributable to the downshift is suppressed.

In this manner, in the second processing according to the modification, when the automobile 1 is in an oversteered state, the K1 clutch is opened and a downshift of the automatic transmission 8 is not performed. Accordingly, the behavior of the automobile 1 is prevented from becoming further unstable due to gear-shifting. In addition, an engine stall can be avoided.

On the other hand, when the automobile 1 is in an oversteered state and the automatic transmission 8 is performing a downshift (a case where the result of step S75 is No) or when a downshift is performed after the oversteered state of the automobile 1 is resolved (a case where the result of step S74 is No), the controller 20 executes gear-shifting control upon a determination of oversteering in step S710. Since a torque fluctuation is suppressed even when a downshift is performed, destabilization of the behavior of the automobile 1 is prevented from deteriorating.

In subsequent step S711, the controller 20 determines whether or not brake regeneration is being performed, and when a result of the determination is Yes meaning that brake regeneration is being performed, the process advances to step S712. On the other hand, when the result of the determination is No meaning that brake regeneration is not being performed, the process advances from step S711 to the fourth processing.

In step S712, the controller 20 stops the regenerative coordination control, secures, with the friction brakes 31, the braking force having been covered by the regenerative braking torque of the motor 5, and achieves deceleration commensurate with braking requested by the driver.

Note that the disclosed technique is not limited to the embodiment described above and also includes various other configurations. For example, the configuration of the automobile 1 is illustrative. The configuration can be appropriately modified according to specifications.

In each of the flows shown in FIGS. 4, 6, 8 to 11, and 15, an order of the steps can be rearranged, a part of the steps can be omitted, or other steps can be added.

SUMMARY

Therefore, a vehicle gear-shifting control apparatus includes:
- an engine 4 which is mounted to an automobile 1 and which generates a travel drive force of the automobile 1;
- a motor 5 which generates a travel drive force of the automobile 1 and which supplies a high-voltage battery 9 with regenerative energy during deceleration of the automobile 1;
- an automatic transmission 8 of which an input shaft 8a is connected to the engine 4 and the motor 5 and an output shaft 8b is connected to rear wheels 2R and which subjects an input rotation to gear-shifting at a transmission gear ratio corresponding to a selected shift stage and outputs the gear-shifted input rotation;
- a friction brake system 3 which distributes a braking force to front wheels 2F and the rear wheels 2R in order to realize braking in accordance with an operation of a brake pedal 19 by a driver; and
- a controller 20 which executes, during deceleration of the automobile 1 during which the friction brake system 3 is distributing a braking force to the front wheels 2F and the rear wheels 2R, regeneration control of imparting a regenerative braking torque to the rear wheels 2R by causing the motor 5 to perform a regeneration operation and gear-shifting control of causing the automatic transmission 8 to perform a downshift by outputting a downshift signal in accordance with the rotation speed of the input shaft 8a to the automatic transmission 8, wherein the controller 20 increases an input torque of the input shaft 8a of the automatic transmission 8 according to a downshift of the automatic transmission 8 so that an acceleration fluctuation of the automobile 1 which accompanies the downshift equals a target acceleration fluctuation (step S48), and when the controller 20 determines an oversteered state of the automobile 1 (Yes in step S31 or S71) during the regeneration control (Yes in step S32 or S72) and during a downshift of the automatic transmission 8 (No in step S35 or S75), the controller 20 increases the input torque of the input shaft 8a of the automatic transmission 8 so that the regenerative braking torque decreases while maintaining the regeneration operation of the motor 5 (step S33 or S73) and, at the same time, the controller 20 causes the automatic transmission 8 to perform the downshift in a state where an amount of increase of the input torque of the input shaft 8a in accordance with the downshift has been increased as compared to an amount of increase during a non-determination of an oversteered state. (step S310 or S710, step S47).

Accordingly, the gear-shifting control apparatus is capable of maintaining a regeneration operation and stabilizing a behavior of the vehicle.

During a determination of an oversteered state, the controller 20 increases the amount of increase of the input torque of the input shaft 8a by setting the target acceleration fluctuation smaller than during a non-determination of an oversteered state (step S47).

In doing so, since the torque fluctuation of the rear wheels 2R which accompanies a downshift is suppressed during a determination of an oversteered state, an advantage is gained in terms of stabilizing the behavior of the automobile 1.

When an oversteered state of the automobile 1 diverges, the controller 20 causes the friction brake system to execute control for stabilizing a behavior of the automobile 1 by imparting a braking force to the front wheels 2F or the rear wheels 2R (FIG. 11).

When an oversteered state of the automobile 1 diverges, due to operation of DSC or ABS, the behavior of the automobile 1 can be prevented from becoming uncontrollable.

The controller 20 executes second regeneration control of imparting a regenerative braking torque to the rear wheels 2R by causing the motor 5 to perform a regeneration operation during deceleration of the automobile 1 during which the friction brake system 3 is not imparting a braking force to the front wheels 2F and the rear wheels 2R, and the controller 20 maintains the regeneration operation when an oversteered state of the automobile 1 is determined during the second regeneration control (No in step S32 or S72).

Accordingly, since a regeneration amount is secured, an advantage is gained in terms of improving fuel efficiency performance of the automobile 1.

When the controller 20 determines an oversteered state of the automobile 1 during the second regeneration control and during a downshift of the automatic transmission 8, the controller 20 maintains the regeneration operation of the motor 5 and, at the same time, causes the automatic transmission 8 to perform a downshift in a state where an amount of increase of the input torque of the input shaft 8a in accordance with the downshift has been increased as compared to an amount of increase during a non-determination of an oversteered state (step S310 or step S710).

Even during the second regeneration control, destabilization of the behavior of the automobile 1 which accompanies a downshift is suppressed by an increase in the input torque of the input shaft 8a while maintaining a regeneration operation of the motor 5.

During a downshift after an oversteered state of the automobile 1 has been resolved, the controller 20 causes the automatic transmission 8 to perform the downshift in a state where an amount of increase of the input torque of the input shaft 8a in accordance with the downshift has been increased as compared to an amount of increase during a non-determination of an oversteered state (No in step S34 or step S74, step S310 or step S710).

Even after an oversteered state has been resolved, destabilization of the behavior of the automobile 1 which accompanies a downshift is suppressed.

The controller 20 determines an oversteered state of the automobile 1 by receiving signals of the yaw rate sensor 54 which outputs a signal related to a behavior of the automobile 1 and the steering angle sensor 53 which outputs a signal related to a steering operation by the driver (step S31 or step S71).

The controller 20 can determine the behavior of the automobile 1 in a speedy and accurate manner.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automobile (vehicle)
19 Brake pedal
110 Steering wheel
20 Controller
2F Front wheel
2R Rear wheel
3 Friction brake system
4 Engine
5 Motor
53 Steering angle sensor (second sensor)
54 Yaw rate sensor (first sensor)
8 Automatic transmission
8a Input shaft
8b Output shaft
9 High-voltage battery

The invention claimed is:

1. A vehicle gear-shifting control apparatus, comprising:
an engine which is mounted to a vehicle and which generates a travel drive force of the vehicle;
a motor which generates another travel drive force of the vehicle and which supplies a battery with regenerative energy during deceleration of the vehicle;
an automatic transmission of which an input shaft is connected to the engine and the motor and an output shaft is connected to a rear wheel and which subjects an input rotation to gear-shifting at a transmission gear ratio corresponding to a shift stage and outputs the gear-shifted input rotation;
a friction brake system which distributes a braking force to a front wheel and the rear wheel in order to realize braking in accordance with a brake pedal operation by a driver; and
a controller which executes, during deceleration of the vehicle during which the friction brake system is distributing the braking force to the front wheel and the rear wheel, a regeneration control of imparting a regenerative braking torque to the rear wheel by causing the motor to perform a regeneration operation and a gear-shifting control of causing the automatic transmission to perform a downshift by outputting a downshift signal in accordance with a rotation speed of the input shaft to the automatic transmission, wherein
the controller increases an input torque of the input shaft of the automatic transmission according to the downshift so that an acceleration fluctuation of the vehicle which accompanies the downshift equals a target acceleration fluctuation, and
when the controller determines an oversteered state of the vehicle during the regeneration control and during the downshift, the controller increases the input torque of the input shaft of the automatic transmission so that the regenerative braking torque decreases while maintaining the regeneration operation of the motor and, at the same time, the controller causes the automatic transmission to perform the downshift in a state where an amount of increase of the input torque of the input shaft in accordance with the downshift has been increased as compared to an amount of increase during a non-determination of an oversteered state.

2. The vehicle gear-shifting control apparatus according to claim 1, wherein
during a determination of the oversteered state, the controller increases the amount of increase of the input torque of the input shaft by setting the target acceleration fluctuation smaller than during the non-determination of the oversteered state.

3. The vehicle gear-shifting control apparatus according to claim 1, wherein
when the oversteered state of the vehicle diverges, the controller causes the friction brake system to execute a control for stabilizing a behavior of the vehicle by imparting the braking force to the front wheel or the rear wheel.

4. The vehicle gear-shifting control apparatus according to claim 1, wherein
the controller executes a second regeneration control of imparting the regenerative braking torque to the rear wheel by causing the motor to perform the regeneration operation during deceleration of the vehicle during which the friction brake system is not imparting the braking force to the front wheel and the rear wheel, and
the controller maintains the regeneration operation when the oversteered state of the vehicle is determined during the second regeneration control.

5. The vehicle gear-shifting control apparatus according to claim 4, wherein
when the controller determines the oversteered state of the vehicle during the second regeneration control and during the downshift of the automatic transmission, the controller maintains the regeneration operation of the motor and, at the same time, causes the automatic transmission to perform the downshift in a state where the amount of increase of the input torque of the input shaft in accordance with the downshift has been increased as compared to the amount of increase during the non-determination of the oversteered state.

6. The vehicle gear-shifting control apparatus according to claim 1, wherein
during the downshift after the oversteered state of the vehicle has been resolved, the controller causes the automatic transmission to perform the downshift in a state where the amount of increase of the input torque of the input shaft in accordance with the downshift has been increased as compared to the amount of increase during the non-determination of the oversteered state.

7. The vehicle gear-shifting control apparatus according to claim 1, wherein
the controller determines the oversteered state of the vehicle by receiving signals of a first sensor which outputs a signal related to a behavior of the vehicle and a second sensor which outputs a signal related to a steering operation by the driver.

8. The vehicle gear-shifting control apparatus according to claim 7, wherein
the controller determines whether or not the vehicle is in the oversteered state based on a deviation between an estimated yaw rate, which can be calculated from the vehicle speed and the steering angle, and an actual yaw rate based on a signal of the first sensor.

9. The vehicle gear-shifting control apparatus according to claim 8, wherein
the controller determines the vehicle is in the oversteered state when the deviation between the estimated yaw rate and the actual yaw rate is equal to or larger than a predetermined value.

\* \* \* \* \*